(12) United States Patent
Czinner et al.

(10) Patent No.: US 11,535,954 B2
(45) Date of Patent: Dec. 27, 2022

(54) SYSTEM, CONTROLLER, AND METHOD FOR DECORTICATION PROCESSING

(71) Applicant: Robert Czinner, Toronto (CA)

(72) Inventors: Robert Czinner, Toronto (CA); Wade Chute, St. Albert (CA)

( * ) Notice: Subject to any disclaimer, the term of this patent is extended or adjusted under 35 U.S.C. 154(b) by 255 days.

(21) Appl. No.: 16/755,184

(22) PCT Filed: Oct. 15, 2018

(86) PCT No.: PCT/CA2018/051295
§ 371 (c)(1),
(2) Date: Apr. 10, 2020

(87) PCT Pub. No.: WO2019/071361
PCT Pub. Date: Apr. 18, 2019

(65) Prior Publication Data
US 2021/0189597 A1 Jun. 24, 2021

Related U.S. Application Data

(60) Provisional application No. 62/572,031, filed on Oct. 13, 2017.

(51) Int. Cl.
*D01B 1/30* (2006.01)
*D01B 1/14* (2006.01)
(Continued)

(52) U.S. Cl.
CPC .............. *D01B 1/30* (2013.01); *C08L 97/02* (2013.01); *D01B 1/14* (2013.01); *G05B 13/0265* (2013.01)

(58) Field of Classification Search
CPC .............. D01B 1/14; D01B 1/30; C08L 97/02
See application file for complete search history.

(56) References Cited

U.S. PATENT DOCUMENTS 805,452 A 11/1905 Deegan et al.
4,805,679 A 2/1989 Czinner
(Continued)

FOREIGN PATENT DOCUMENTS

AT 517689 B1 4/2017
CN 101688328 A 3/2010
(Continued)

OTHER PUBLICATIONS

EP Extended European Search Report for EP 18866822.2, European Patent Office, completed: May 19, 2021, dated May 28, 2021.
(Continued)

*Primary Examiner* — Shaun R Hurley
(74) *Attorney, Agent, or Firm* — Bhole IP Law; Anil Bhole; Marc Lampert

(57) ABSTRACT

A system, controller, and method for decortication processing on one or more input units of hemp into one or more resultant products. The method includes: analyzing one or more characteristics of the input units; cutting the input units into a predetermined size; opening the cut input units; performing decortication on the opened input units to separate the hemp into components, the components including bast, fibre, and hurd; densifying the fibre into bales; pulverizing the hurd and bast; combining the pulverized hurd and bast with thermoplastic polymers into a resultant product; receiving analyzer data from at least one of the decortication, the densifying, the pulverizing, and the combining; training a machine learning model based on the analyzer data; using the trained machine learning model to adjust one or more aspects to achieve a desired resultant product.

13 Claims, 12 Drawing Sheets

(51) Int. Cl.
*C08L 97/02* (2006.01)
*G05B 13/02* (2006.01)

(56) References Cited

U.S. PATENT DOCUMENTS

| | | | | |
|---|---|---|---|---|
| 4,936,206 | A * | 6/1990 | Miles | B30B 9/3057 |
| | | | | 100/219 |
| 5,101,672 | A * | 4/1992 | Anthony | G01N 1/20 |
| | | | | 73/864.81 |
| 5,892,157 | A * | 4/1999 | Syre | G01L 5/10 |
| | | | | 73/849 |
| 6,098,454 | A * | 8/2000 | Ghorashi | G01N 33/362 |
| | | | | 73/160 |
| 6,112,131 | A * | 8/2000 | Ghorashi | G01N 33/362 |
| | | | | 73/866 |
| 6,133,348 | A * | 10/2000 | Kolla | C08L 97/02 |
| | | | | 524/35 |
| 6,719,225 | B1 * | 4/2004 | Hesch | D01B 9/00 |
| | | | | 241/242 |
| 6,841,231 | B1 * | 1/2005 | Liang | C08L 97/02 |
| | | | | 428/296.7 |
| 7,669,292 | B2 * | 3/2010 | Chute | D01B 1/50 |
| | | | | 19/24 |
| 9,777,128 | B2 | 10/2017 | Henry et al. | |
| 2003/0050728 | A1 | 3/2003 | Sarabi et al. | |
| 2011/0105650 | A1 * | 5/2011 | Yan | H04L 29/12452 |
| | | | | 162/28 |
| 2014/0099497 | A1 * | 4/2014 | Panigrahi | C08L 97/02 |
| | | | | 428/221 |
| 2015/0166745 | A1 * | 6/2015 | Henry | D01B 1/12 |
| | | | | 19/205 |
| 2015/0240058 | A1 * | 8/2015 | Panigrahi | D01G 15/02 |
| | | | | 19/115 R |
| 2016/0325288 | A1 * | 11/2016 | Bates | B02C 23/20 |
| 2018/0304274 | A1 * | 10/2018 | Bates | B02C 19/16 |

FOREIGN PATENT DOCUMENTS

| | | |
|---|---|---|
| CN | 105637127 A | 6/2016 |
| CN | 106435760 A | 2/2017 |
| CN | 106567138 A | 4/2017 |
| CN | 107492251 A | 12/2017 |
| RU | 2422821 C2 | 6/2011 |
| RU | 2621552 C2 | 6/2017 |
| SU | 1078273 A1 | 3/1984 |
| WO | 2017080999 A1 | 5/2017 |
| WO | 2019071361 A1 | 4/2019 |

OTHER PUBLICATIONS

First Office Action for 201880073222.2, China National Intellectual Property Administration, dated Nov. 9, 2021.
International Preliminary Report on Patentability for PCT/CA2018/051295, The International Bureau of WIPO, International filing: Oct. 15, 2018, dated Apr. 14, 2020.
International Search Report for application No. PCT/CA2020/050989 dated Jul. 16, 2020.
International Search Report for PCT/CA2018/051295, ISA/CA, international filing: Oct. 15, 2018, search completed: Jan. 3, 2019, dated Feb. 5, 2019.
Office Action for 2020115475, Russian Federal Service for Intellectual Property, application filed: Oct. 15, 2018, completed: Mar. 11, 2022, dated Mar. 31, 2022.
Search Report for 2019101974297, China National Intellectual Property Administration, dated Mar. 15, 2019.
Second Office Action for 201880073222.2, China National Intellectual Property Administration, dated Mar. 7, 2022.
Written Opinion of ISA for PCT/CA2018/051295, Canadian Intellectual Property Office, international filing: Oct. 15, 2018, completed: Jan. 21, 2019, dated Feb. 5, 2019.
Written Opinion of the International Searching Authority for application No. PCT/CA2020/050989 dated Jul. 16, 2020.
Written Opinion of the International Searching Authority for application No. PCT/CA2020/050989, The International Bureau of WIPO, international filing: Jul. 16, 2020, report dated Jan. 18, 2022.
Search Report for BR112020007217-6, Brazil National Institute of Industrial Property, dated May 26, 2022.

* cited by examiner

SYSTEM, CONTROLLER, AND METHOD FOR DECORTICATION PROCESSING

TECHNICAL FIELD

The present disclosure relates generally to processing of biomass products, including agricultural products. More particularly, the present disclosure relates to system, controller, and method for decortication processing of biomass products.

BACKGROUND

Decortication is a process that grinds and separates bales of whole straw of certain dicotyledonous plants into various fibrous and non-fibrous fractions for internal use or sale to others. In a particular case, the straw can be hemp straw.

The fibres from hemp stalk typically provide certain benefits; for example, the stalk typically has a high strength to weight ratio. As another example, the stalk can typically have properties such as being anti-bacterial and resistant to water.

From an agronomical perspective, hemp typically grows rapidly in a variety of soils and climates. It is typically resistant to crop pests, reducing the requirement for herbicides and pesticides. It is a trio "product" crop, capable of producing seed, stalk, and valuable biochemicals, at above average volume and dollar yields, compared to some other crops.

Once processed, the typical components of hemp straw, also known as the stalk, are bast fibre, hurd, short fibre and dust. Each of these components can become valuable raw materials for use in a variety of consumer, commercial and industrial products. These components can be utilized in many industries, for example, consumer goods, automotive, construction materials, industrial absorbents, and animal and pet care.

Typically, decortication is used to fractionate whole hemp straw into various components, such as clean bast fibre, clean hurd, hemp dust, and short fibre. The bast fibre fraction is typically approximately 20-25% by weight of a decortication system's product, depending on, for example, the variety being grown, agronomic practices, retting extent, moisture content at time of processing, decortication method, and desired product cleanliness (i.e. extent of contamination with hurd or dust). Examples of applications for "clean" bast fibre (i.e. >95% purity) include airlaid nonwoven mats and blankets, specialty pulp and paper, cellulose chemicals, textiles and geotextiles. Short fibre is typically shorter and of lower purity than clean bast, accounting for approximately 0-5% by weight of the decortication system's product. The hurd fraction typically accounts for approximately 40-50% by weight of the decortication system's product, depending on, for example, the variety being grown, agronomic practices, retting extent, moisture content at time of processing, decortication method and power input to process, and desired hurd properties such as cleanliness and particle size distribution. Examples of applications for clean hurd are construction, industrial and consumer absorbents, animal bedding, and as a feedstock for biochemicals, bio-composite products, and bioenergy industries. Hemp dust is typically mechanically detached during the decortication process and collected. Hemp dust typically accounts for approximately 25-40% by weight of the decortication system's product, depending on, for example, the variety being grown, agronomic practices, retting extent, moisture content at time of processing, decortication method and power input to process. As an example, hemp dust can be used as feedstock for biochar production (horticultural grade), or as a filler for bioplastics.

Exemplary objectives of the decortication process are to maximize the commercial value of the sum of the processed fractions while minimizing the processing costs, which are mostly related to power consumption, labour and feedstock price.

Typically, the decortication process begins with raw material grading and selection. This can be done either in the field (i.e. before the material ships) or at the plant site (i.e. as the material is received). Conventionally, selection and purchase of straw suitable for decortication is left to experienced and knowledgeable straw specialists who travel from field to field, physically inspecting crops and performing rudimentary manual tests (both qualitative and quantitative) related to fibre quality, retting extent and moisture content. This specialist would then make a purchasing decision based on these tests along with knowledge of the processing facility's volume needs, the grower's price expectations, and the availability and quality of materials in other locations. The decortication process typically concludes when various processed straw fractions are placed either into bulk bins for future use (for example, compounding and extrusion into composite trim) or packaged for sale to others (for example, baled bast fibre for sale to nonwoven lines, hurd in 1 $m^3$ totes for sale to insulated concrete manufacturers).

SUMMARY

In an aspect, there is provided a method for decortication processing on one or more input units of agricultural biomass, the method comprising: analyzing one or more characteristics of the input units; cutting the input units into a predetermined size; opening the cut input units; decorticating the opened input units to separate the opened input units into components, the components comprising bast, short fibre, hurd, and dust; cutting the bast into to one or more lengths; blending the hurd, cut bast and short fibre in determined proportions; pulverizing the blend; combining the blend with thermoplastic polymers into a resultant product; receiving analyzer data from at least one of the decorticating, the cutting, the blending, the pulverizing, and the combining; training a machine learning model based on the analyzer data to estimate relationships between component content of the resultant product and one or more aspects of at least one of the analyzing, the cutting, the opening, the decorticating, the densifying, the pulverizing, and the combining; adjusting the one or more aspects to achieve a desired resultant product based at least in part on output from the trained machine learning model.

In a particular case, the agricultural biomass are dicotyledonous plants.

In another case, the one or more characteristics of the input units comprises sensor data of at least one of retting extent, chemical composition, and moisture content.

In yet another case, the estimated relationships comprises predicting potential yield of bast, hurd, and dust.

In yet another case, adjusting the one or more aspects to achieve the desired resultant product comprises selecting material to be used as subsequent input units.

In yet another case, the method further comprising identifying bast having short bast fibres and re-blending the identified bast back into the hurd to obtain a bast-hurd blend.

In yet another case, further comprising determining a mechanical property of the resultant product by performing mechanical testing of the resultant product with a dynamic flexural analyzer.

In yet another case, the component content of the resultant product comprises at least one of product yield potential, product value potential, and projected processing cost, and wherein the estimation comprises using knowledge discovery in databases (KDD) based on the analyzed one or more characteristics of the input units.

In yet another case, the method further comprising measuring bast fibre purity with a sensor at a stroke of a bale press hydraulic unit.

In yet another case, the resultant product has over 50% fibre content.

In another aspect, there is provided a controller for decortication processing on one or more input units of agricultural biomass, the controller comprising at least one processing unit and a data storage, the at least one processing unit in communication with the data storage and configured to execute: a control module to: receive one or more characteristics of the input units from one or more sensors; instruct a cutting unit to cut the input units into a predetermined size; instruct an opening unit to open the cut input units; instruct a decorticator to decorticate the opened input units to separate the opened input units into components, the components comprising bast, short fibre, hurd, and dust; instruct a blending unit to blend hurd, short fibre and cut bast; instruct a pulverizer to pulverize the hurd and the bast; instruct a compounder to combine the pulverized hurd and bast with thermoplastic polymers into a resultant product; and receive data from at least one of the decorticator, the blending unit, the baler, the pulverizer, the compounder, and the one or more sensors; and a data science module to: train a machine learning model based on the analyzer data to estimate relationships between component content of the resultant product and one or more aspects of at least one of the analyzing, the cutting, the opening, the decorticating, the densifying, the pulverizing, and the combining; and communicate to the control module adjustments to be made to the one or more aspects to achieve a desired resultant product based at least in part on output from the trained machine learning model.

In a particular case, the agricultural biomass comprises dicotyledonous plants.

In yet another case, the one or more characteristics of the input units comprises sensor data of at least one of retting extent, chemical composition, and moisture content.

In yet another case, the estimated relationships comprises predicting potential yield of bast, hurd, and dust.

In yet another case, adjusting the one or more aspects to achieve the desired resultant product comprises selecting material to be used as subsequent input units.

In yet another case, the control module further receives identifying information of bast having short bast fibres and instructs re-blending the identified bast back into the hurd to obtain a bast-hurd blend.

In yet another case, the controller further comprising determining a mechanical property of the resultant product by performing mechanical testing of the resultant product with a dynamic flexural analyzer.

In yet another case, the component content of the resultant product comprises at least one of product yield potential, product value potential, and projected processing cost, and wherein the estimation comprises using knowledge discovery in databases (KDD) based on the analyzed one or more characteristics of the input units.

In yet another case, the controller further comprising measuring bast fibre purity with a sensor at a stroke of a bale press hydraulic unit.

In another aspect, there is provided a bale press comprising: a frame; a motor mounted to the frame; a piston located in the frame and mechanically connected to the motor, the piston moveable along a vertical axis; a bale press located at a lower end of the piston, the bale press comprising at least one transparent window; and a sensor located on the bale press and configured to sense via the transparent window, the frame receiving material between the bale press and a lower portion of the frame, the bale press forced downwards by the motor via the piston to compress the material, the sensor sensing at least one characteristic of the material during compression of the material.

In another aspect, there is provided a dynamic flexural tester for testing mechanical properties on a material having a fixed geometry, comprising: a pair of fixed lower rollers; a moveable upper roller located horizontally between the pair of fixed lower rollers and vertically above the pair of fixed lower rollers; a mechanical positioner in mechanical communication with the upper roller to move the upper roller along the vertical axis; and a load cell located between the mechanical positioner and the upper roller, the material received between the upper and lower rollers where the mechanical positioner applies a downward force on the upper roller until the upper roller reaches a predetermined downward deflection distance, a force is registered by the load cell that is proportional to the flexural strength of the material when the upper roller reaches the predetermined downward deflection distance.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

Preferred embodiments of the present disclosure will now be described, by way of example only, with reference to the attached Figures, wherein.

DETAILED DESCRIPTION

Figure 1:
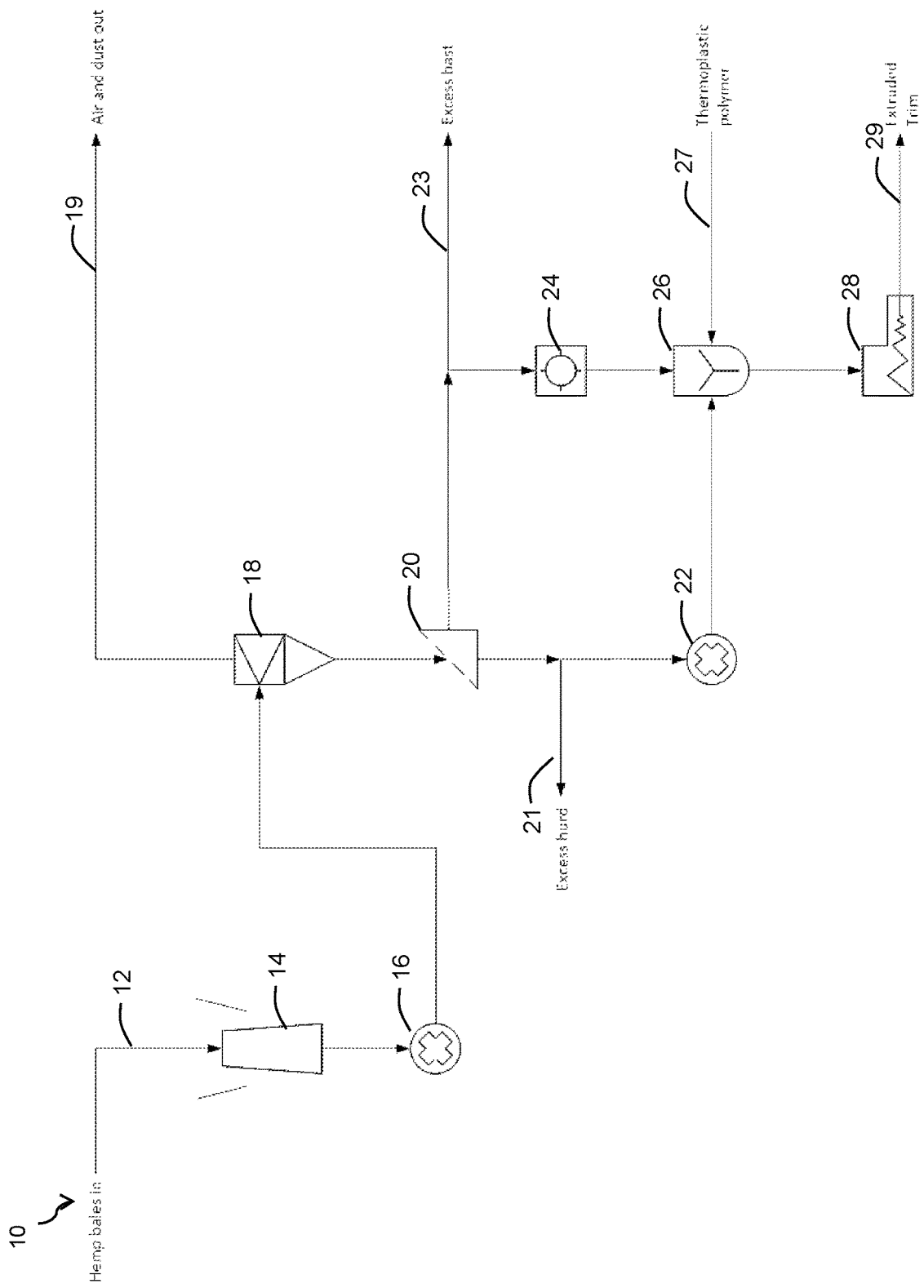
FIG. 1 diagrammatically illustrates a first decortication stage of an exemplary decortication process.

Before the subject matter of the present disclosure is described in further detail, it is to be understood that the invention is not limited to the particular embodiments described, but only by the scope of the claims appended hereto. It is also to be understood that the terminology used herein is for the purpose of describing particular embodiments only, and is not intended to be limiting, since the scope of the present disclosure will be limited only by the appended claims.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments herein. Also, the description is not to be considered as limiting the scope of the embodiments described herein.

Various terms used throughout the present disclosure may be read and understood as follows, unless the context indicates otherwise: "or" as used throughout is inclusive, as though written and/or; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" and "exemplifying" and not necessarily as "preferred" over other embodiments. Further definitions for terms may be set out herein; these may apply to prior and subsequent instances of those terms, as will be understood from a reading of the present disclosure/description.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

Any module, unit, component, server, computer, terminal, engine, or device exemplified herein that executes instructions may include or otherwise have access to computer readable media such as storage media, computer storage media, or data storage devices (removable and non-removable) such as, for example, magnetic discs, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The present disclosure relates generally to processing of biomass products, including biomass agricultural products. More particularly, the present disclosure relates to system, controller, and method for decortication processing.

Advantageously, the embodiments described herein can provide a low-cost, high-capacity, easily scalable, and flexible processing of biomass products, including biomass agricultural products. In a particular case, the biomass agricultural products can be dicotyledonous plant products; for example, hemp, flax, kenaf, and jute. Further, advantageously, the embodiments described herein can substantially reduce material handling and reduce production costs. Further, advantageously, the embodiments described herein allow for vertical integration of hemp stalk processing to automatically direct raw hemp stalk components, on demand, towards production of higher value products.

Advantageously, the embodiments described herein allow for spectrometry analysis, for example using visible and near-infrared spectrometer (Vis-NIR), of samples received from incoming bales to determine at least one of retting extent, chemical composition, and moisture content to enable a controller to predict a potential yield of at least one of bast, hurd, and dust when processing these bales. The spectral analysis may accordingly be used as a basis for material selection within a computer-integrated manufacturing (CIM) environment that is simultaneously optimizing production of each different product for different customers. As described herein the use of a spectrometry sensor may replace the subjective quality assessments of such materials at a stacking yard. The spectrometry sensors can be advantageously used by an artificial intelligence (AI) system (e.g., a machine learning paradigm) to select received bales to process into various fractions, and which can then be scanned by other "intelligent sensors" (including another spectrometry sensor at the bast fibre baling line). In most cases, as the sensed bales are moved throughout the decortication process, the bales can be tracked, and their output characteristics compared to input characteristics can be stored in a database.

In some cases, decortication can be performed in a stationary facility. In other cases, decortication can be performed in a mobile facility that can be moved into regions with substantial hemp crop production.

Decortication can be performed on properly-retted hemp straw bales having a moisture content in the range of 10-20% by weight; although some decorticators can be designed and capable of decorticating "green" material, shortly after processed in the field and without any retting. Material can be new or weathered, with older material likely being drier with higher spoilage, depending on how it was stored. The valuation of straw can depend on a variety of factors, for example, variety, maturity, crop year, moisture content, retting extent, spoilage, dockage (i.e. weeds, seeds and dirt). Higher prices are typically given to clean, weed-free, properly-retted straw bales from fibre hemp varieties at 12-15% moisture.

FIG. 1 diagrammatically illustrates a single stage of an exemplary decortication process 10, according to an embodiment. Hemp bales are initially received from farms, sampled, scanned, labeled, and stacked. The bales specified by the CIM system based on their scanned characteristics are retrieved from the stacking yard. The hemp bales are received at 12 and the bales are broken apart at 14. The bales are subject to decortication and fibre cleaning at 16. The components are then sent for air separation or dust removal at 18 where air and dust are removed at 19. The rest of the components are sent for screening at 20 where excess hurd (i.e. hurd that is not required by the compounding line) is removed at 21. The remaining hurd is sent for hurd grinding at 22. In addition, excess bast (i.e bast that is not required by the compounding line) is removed at 23. The remaining bast is subject to bast fibre cutting at 24. The processed hurd and bast can then be combined, with thermoplastic polymer inputted at 27, for blending at 26. The blended product can be compounded and extruded at 28, with the end-product of extruded trim being output at 29.

In some cases, a pulverizing line is fed clean hurd with just enough bast added back in (preferably, short bast first, then more long bast if required) to achieve mechanical property targets in the compounded pellets or extruded profiles.

Figure 2:
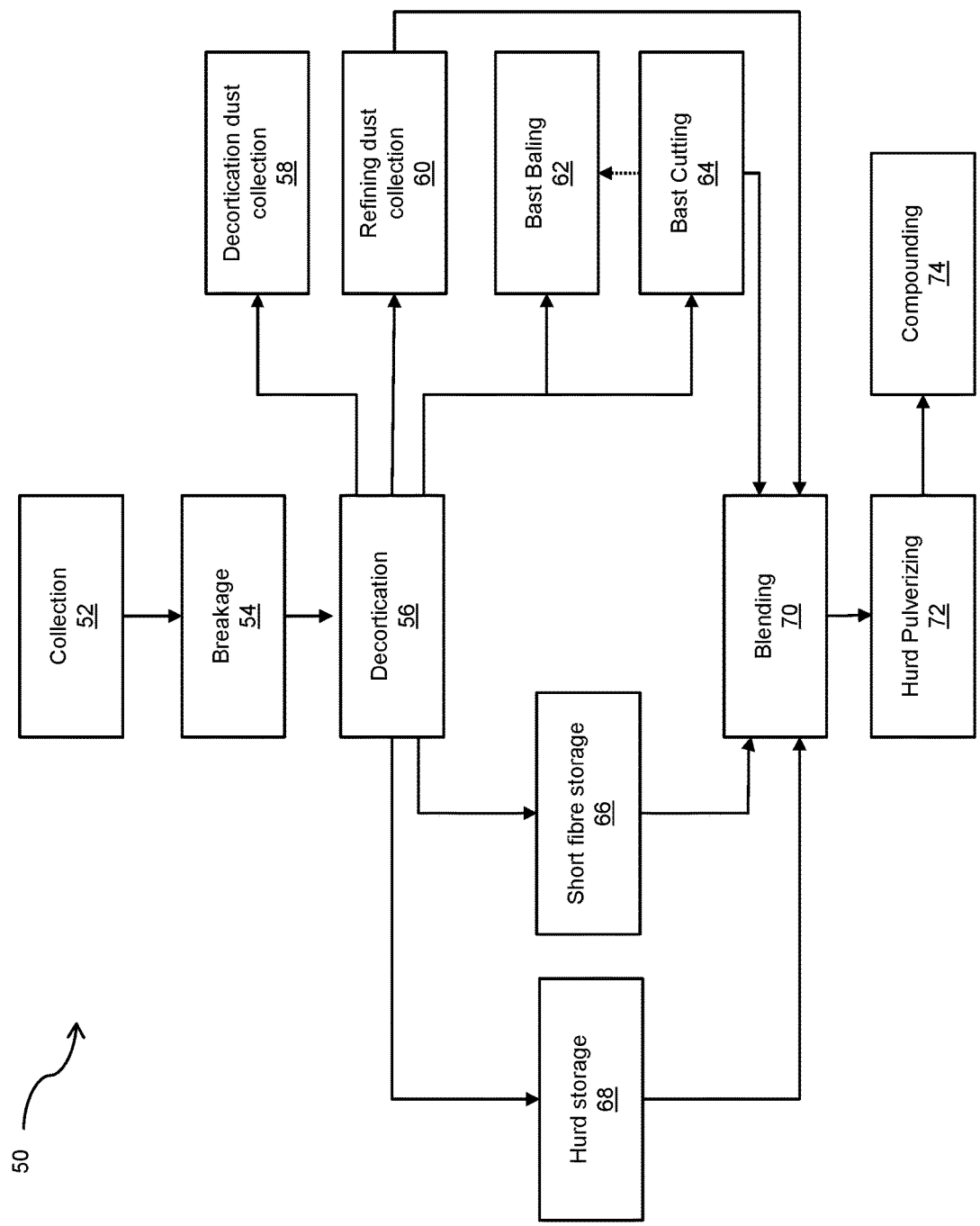
FIG. 2 illustrates various stages of an exemplary decortication process.

FIG. 2 illustrates various stages of an exemplary decortication process 50, according to an embodiment. At a collection stage 52, bales of hemp are received at a plant site and are, for example, offloaded, weighed, tested for moisture content, retting extent and chemical composition, labelled, and stored for future use. The chemical composition (i.e. cellulose, hemicellulose, lignin, ash, and extractives) is typically linked to relative composition of bast, hurd and dust, and is therefore useful in predicting theoretical yields of decorticated fractions. The retting extent and moisture content are typically linked to product purity, power consumption and fibre damage during decortication. Bales can be received in round or square formats having different weights. A valuable aspect of the first stage 12 is the ability to provide accurate and impartial raw material valuation in order to assist with production planning. In an example, one or more spectrometry sensors, such as visible and near-infrared spectrometer (Vis-NIR) units, can be used to analyse bale core samples. In some cases, the Vis-NIR units can ascertain moisture content and chemical composition, such as composition of cellulose, hemicellulose, lignin, extractives and ash of the bale. In some cases, straw surface can also be scanned for determination of retting extent. In further cases, other types or combinations of analyzer units may be used to extract the same information. This information can be used to assign a quality and a value to the bale. In an example, as described herein, bales can be assigned the following information: product yield potential (individual products), product value potential (individual products), and/or projected processing cost.

At a breakage stage 54, bales are broken apart into a loose straw form, such that the straw can be fed to a decorticator. This stage also allows the straw pieces to be cut into lengths of a predetermined size, or utilizing the system, pieces can be cut to fulfill demand. In an example, a cutting unit (for example, a guillotine mechanism) can be used to cut the bales (or portions thereof), followed by "opening" by an opening unit to loosen the straw and allow for pneumatic conveyance and continuous metering to the decorticator. In a particular case, round bales first need to be cut into similar lengths with a guillotine cutter. In another case, square bales may be entered directly into the opening unit or cut into similar lengths with a guillotine cutter. The opening unit opens the straw and ensures a relatively even flow of material towards the decorticating section. In some cases, at discharge of the bale opener, moisture can be added to the raw material based on its original moisture content and feedback from process sensors; for example, decorticator motor load, relative humidity probe located in the dust collection system, and a Vis-NIR analyser located in the bast fibre baler. In some cases, moisture addition can be by steam or by misting spray nozzles. In some cases, a separate "live-bottom" retention vessel or bin may be required for moisture content to fully equilibrate before decortication or cleaning.

In some cases, the system selects suitable bales from the available bale inventory based on, for example, one or more of the following criteria: preliminary Vis-NIR scan results, open orders, delivery dates, projected demand, product inventory levels, raw material inventory levels, raw material age, market prices for different products, and input costs (e.g. power price). Bales are retrieved from a stacking yard and brought to the plant site for processing. This selection process may be exclusively based on sensor data from when the bales are received. The sensor data may be obtained from a Vis-NIR, but any suitable sensor or combination of sensors can be used to provide information on chemical composition, retting extent and moisture content.

Bales can be selected for specific orders based on predictions made by the data science module 122 of fraction yields and product attributes, with the data collected when the bale is first received at the stacking yard as input features (for example, weight, moisture content, Vis-NIR scanning data) to a machine learning model. In this way, the scanned characteristics of the bale can be matched with optimal applications for the resulting decortication fractions. In this way, bales can be declined automatically if their moisture content is too high (for example, due to spoilage and increased fire risk during storage).

In some cases, the technical fibre length can be cut and thus reduced as specified for specific end users. Such end-user applications can include, for example, custom-cut technical fibres for cottonizing blending and spinning with other natural or synthetic fibres for woven fabrics; reinforcement fibres for specialty papers; compounding with thermoplastics and extrusion or pelletizing or injection molding as biocomposite materials; or the like. In a particular case, technical fibres can be deposited on an infeed belt of a Pierret cutter, or similar device, operating at a speed predetermined to deliver a specific cut length. Once cut in the first direction, fibres can then fall onto the infeed belt of the second cutter oriented perpendicular relative to the first cutter. In this way, fibres can be cut in both directions to a high level of uniformity as required by specific end-users. The frequency of the cutting head in relation to the speed of the infeed belt and hold-down rollers can be used to determine the cut length in each stage.

In some embodiments, as described herein, machine learning (ML) techniques can be used, with automated knowledge discovery in data (KDD), on sensor feedback data from a continuous flexural analyser on the extrusion line to adjust fibre cut length to control flexural strength. The output from the continuous flexural analyser can be used to adjust bast fibre content for mechanical property control.

At a decortication stage 56, the decorticator mechanically processes the opened straw to detach bast fibre bundles from hurd particles. Once mechanically detached, the components may be separated into bast and hurd by screening. The mechanical processing and separation can be repeated in order to produce fibres that are clean enough for refining. Dust can be removed via the "condensing units" that separate air from bast and hurd before screening. Preferably, bast fibres are processed that are pure enough to feed a refining line, and to produce clean hurd for sale. At block 68, the hurd can be stored at a storage unit for output or for further processing as described herein.

In an example of the decortication stage 56, moisture-equilibrated straw can be aspirated from the straw opening unit, or live bottom bin system, and fed into the decorticator to detach the hurd from the fibre, and produce a mixture of fibre, hurd and dust. At the exit of the decorticator, material is aspirated into an air separator that removes air and dust from the detached fibre and hurd. The fibre and hurd can then fall into a fibre separator (for example, a screen) where a large part of the hurd can be removed.

In some cases, the bast fibre exiting the fibre separator can then be re-processed in a second decorticator, air separator and fibre separator to produce cleaner bast fibre at approximately 80-85% purity. This level of purity is likely sufficiently clean to feed a refining line. In some cases, the bast fibre can be directed to a baler, or can be further processed in the refining line to a higher level of purity. In some cases, at block 58, dust is extracted from the air handling system via a dust cleaner. Although the level of purity achieved may reach 80-85%, it is contemplated that a level of purity as low as 40% to 50% may be achieved for such reasons as cost-reduction, or higher than 85% if desired or required by downstream customers.

In some cases, the hurd stream can be further classified by particle size for certain markets or industries; for example, insulated concrete, large animal bedding, small animal bedding, or the like. In some cases, short bast fibres (for example, under 2" in length) may also be recovered from the hurd stream for reintroduction into the bast product, separate packaging for sale, or further mechanical processing into reinforcement fibres for compounding and extrusion as biocomposite materials. At block 66, the short fibre can be stored at a storage unit for output or for further processing as described herein. The reintroduction of bast fibres to the hurd may result in increased mechanical performance of composites (such as biocomposite materials).

In some cases, the decorticator can be fitted with an inverter duty motor and variable frequency drive (VFD). Information, such as power consumption, from the VFD can be used in conjunction with relative humidity measurements taken in the air handling system and bast purity measurements taken at the fibre baler using the spectrometry sensor to adjust operating conditions such as decorticator RPM, moisture addition rates, and straw feed rates.

In some cases, one or more refining stages (for example, each consisting of a fine opener and a screening device such as a step-cleaner) can be used for further purification of decorticated bast fibre from, for example, 80-85% purity to, for example, 95-98% purity; with associated hurd cleaning and short fibre recovery. Advantageously, this can improve bast fibre purity, minimize fibre damage or shortening, clean hurd, and recover short fibre. In this case, bast fibre containing 15-20% hurd is opened using two fine openers. The fibre can then be aspirated, fed directly to two step cleaners, and fed to a finishing cleaner. At the end of the refiner, the bast fibre can contain less than 5% hurd. This can be referred to as "technical fibre", and can be used in various applications; for example, airlaid nonwovens like insulation batt, geotextiles, fibre mats for resin transfer molding, or the like. These fibres can also be cross-cut to specific lengths using a Pierret cutter, or similar device, for use in, for example, compounding and extrusion of biocomposite materials, reinforcement fibres in specialty papers, or the like. Hurd removed from the bast can be cleaned of short fibre and blended with clean hurd from the decortication line or packaged separately for sale. In some cases, the particle size of this hurd may be smaller than that from decortication due to the extra mechanical processing it can receive. In some cases, at block 60, dust is extracted from the refiner via a dust collection unit.

At a bast baling stage 62, a baler can be used to densify technical fibres into bales of, preferably, consistent weight and moisture content. In some cases, an analysis of the purity of the fibres can also be undertaken with, for example, a spectroscopy sensor, such as a Vis-NIR unit, associated with the baler. The spectroscopy sensor can measure moisture content for direct feedback control to a humidification step. During the humidification step, moisture can be added to a discharge of a unit feeding a decortication stage, with provision to add more moisture at a feed to a refining stage. Generally, most of the moisture can be added prior to decortication.

The spectroscopy sensor (for example, Vis-NIR sensor) can measure bast fibre purity with every stroke of a bale press hydraulic unit; the bale press hydraulic unit generally comprising a hydraulic ram that compresses bast fibre in the baler. The spectroscopy sensor can provide multiple analyses throughout each bale as it is being made; this can provide enhanced quality control as compared to scanning completed bales. It should be appreciated that in other cases, another sensor or combination of sensors that is capable of determining moisture content (for feedback moisture control) and/or measuring purity (for control of decortication) can be used. Fibre baling is particularly used to package and brand the fibre product, and in some cases, perform quality control and process control feedback.

Figure 11:
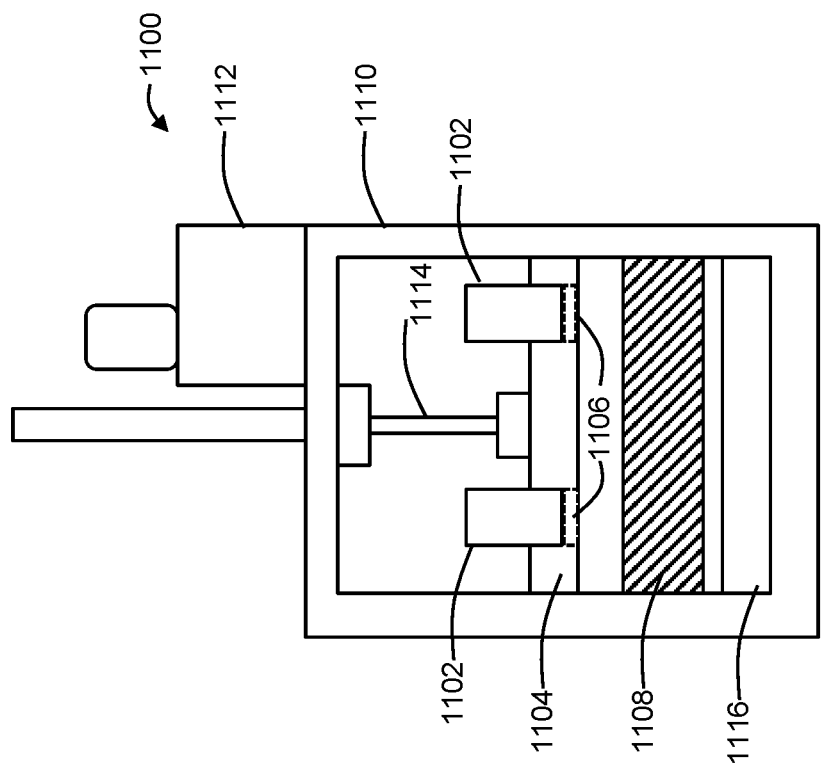
FIG. 11 illustrates a front diagrammatic view of bale press hydraulic unit according to an embodiment.

As shown in the exemplary embodiment of a bale press hydraulic unit 1100 of FIG. 11, one or more sensor heads 1102 can be mounted in or on the face of the bale press 1104. In this embodiment, the bale press 1100 includes a frame 1110 and a motor 1112 mounted on the frame to drive a piston 1114 connected to the bale press 1104. The piston 1114 periodically forces the bale press 1104 downwards in a stroke motion to compress material 1108 between the bale press 1104 and a lower portion 1116. For each stroke, or after a certain number of strokes, a scan can take place through a transparent window 1106 on the bale press 1104 that can withstand the pressure of bale compression. Every time the bale press 1100 reaches a predetermined hydraulic pressure (signifying that material 1108 is being compressed), the sensor 1102 can take a reading to determine characteristics of the material being compressed. In a particular case, the sensor heads 1102 can be at least one of a spectrometry sensor (such as Vis-NIR), a moisture probe, an air pressure probe, or the like.

In some cases, a "fineness" sensor can be integrated into the bale face 1104 that would measure compressed air flow from a nozzle into the fibre at a specific hydraulic ram pressure. Finer fibers restrict air flow more than coarse fibres, thus giving feedback regarding the value of fibres in either textiles or air-laid nonwovens.

At the bast baling stage 62, the weight of each bale can be measured, along with its moisture content and bast fibre purity (for example, by a spectroscopy sensor such as a Vis-NIR analyzer). In some cases, bale weight can be corrected for moisture content to ensure a consistent mass of product. In some cases, product sensor information can be fed back into a control system for process tuning, and also compiled with the corresponding raw material properties and plant operating conditions for real-time product costing and value optimization. In general, dry weight of the bale is determined as 'total bale weight' *(100%–% moisture). In this way, fibre can be determined (and in some cases, sold) on a dry basis or at a standard moisture content.

In some cases, using ML and/or KDD, bale selection and processing setup can be automated for specific production runs based on the yields of different fractions, product attributes, or overall economic performance. Advantageously, this can minimize production of "off-grade" materials between different production runs and support new product development through extrapolation of large quantities of operating data to "expand" the range of possible properties and operating conditions.

As the system learns from gathering data from product testing and process operation, it can use KDD to link product attributes and processing conditions to raw material attributes, such as from scans received when the material was received. In this way, a machine learning model can be used to automatically receive orders and select input materials (for example, from the yard) that are optimized to meet the specifications of the orders with respect to, for example, quantity, quality, and the like, as well as set-up the processing conditions of the decortication system. At a bast cutting stage 64, the bast coming from the decortication stage 64 can be cut into a desired or specified length by a cutting unit. In some cases, the cut bast can be sent to a blending stage 70. In other cases, the cut bast can be sent to the bast baling stage 62.

At a hurd pulverizing stage 72, hurd and chopped bast can be ground and sieved prior to compounding with thermoplastics and extrusion into either profiles (for example, for sale to end-users) or master-batch pellets (for example, for sale to other extrusion facilities). Pulverizing can be done to generate consistent fine particles for compounding. In some cases, pulverizing can be undertaken with a hammermill. In some cases, a cyclone can be used for separation of air from pulverized hurd and bast. Hurd particles and a metered amount of bast fibre can be blended together before being introduced to the hammermill with a slotted or perforated screen; the size can be determined by processing extent in a final product. The proportions of hurd particles and bast fibre to be blended together can be chosen to meet mechanical property targets for composites, as described herein. Particles and fibres can be mechanically ground until they pass through the screen, then they can be aspirated to a cyclone and rotary airlock for air removal. The pulverized material can then be dropped into a metering bin and volumetric (or mass-based) metering screw for consistent delivery to a compounder. In some cases, aspiration can be provided by the decortication plant's air handling system, which is preferably sized appropriately for this additional air volume; this approach can be beneficial because any dust carryover can be captured by a baghouse.

At a compounding stage 74, pulverized materials can be combined with liquid thermoplastic polymers or dispersing agents in a pellet or extruded shape of uniform appearance and composition. In some cases, hemp dust can be introduced into the extrusion with the other components. Compounding can produce pellets for extrusion or injection molding or can produce extruded profiles (e.g. trim) for sale to others. Pulverized hurd and short fibre can be fed into a compounding extruder, along with the appropriate amount and type of thermoplastic polymers and additives (such as a thermoplastic dispersing agent, if needed), where they are heated and blended together to produce a uniform mixture. Examples of suitable thermoplastic polymers include PVC, polypropylene, polyethylene, polyhydroxybutyric acid, polyvinyl alcohol, and polylactic acid. If master batch pellets are the target product, the mixture can be extruded through a pelleting die and onto a cooling conveyor before bagging. If extruded profiles are the target product, the mixture can be transferred in its molten state to multiple profile extruders for subsequent formation of the finished cross-section. This can be followed by cooling and cutting to length. In some cases, automated testing of extruded profiles for chemical composition (via for example a Vis-NIR analyzer) and flexural strength (via for example mechanical deflection testing) can provide quality control information and feedback to the decortication system to adjust the quantity and/or length of chopped bast fibres being introduced to the compounding system. In some cases, control conditions can be determined by inputting such test data, in some cases coupled with operating conditions and raw material attributes, to ML and KDD techniques.

In some embodiments, the target product of compounding stage 62 may be a durable, easily dispersable, fibre composite pellet having a high fibre content. A durable, easily dispersable pellet at 95% fibre content or higher can then be blended with natural polymers. Where master batch pellets are the target product, it may be desirable to have fibre content of 95% to 100%; however, it will be appreciated that downstream processors of these master batch pellets may be satisfied with any other percentage of fibre content, such as 50% (or higher).

Figure 3:
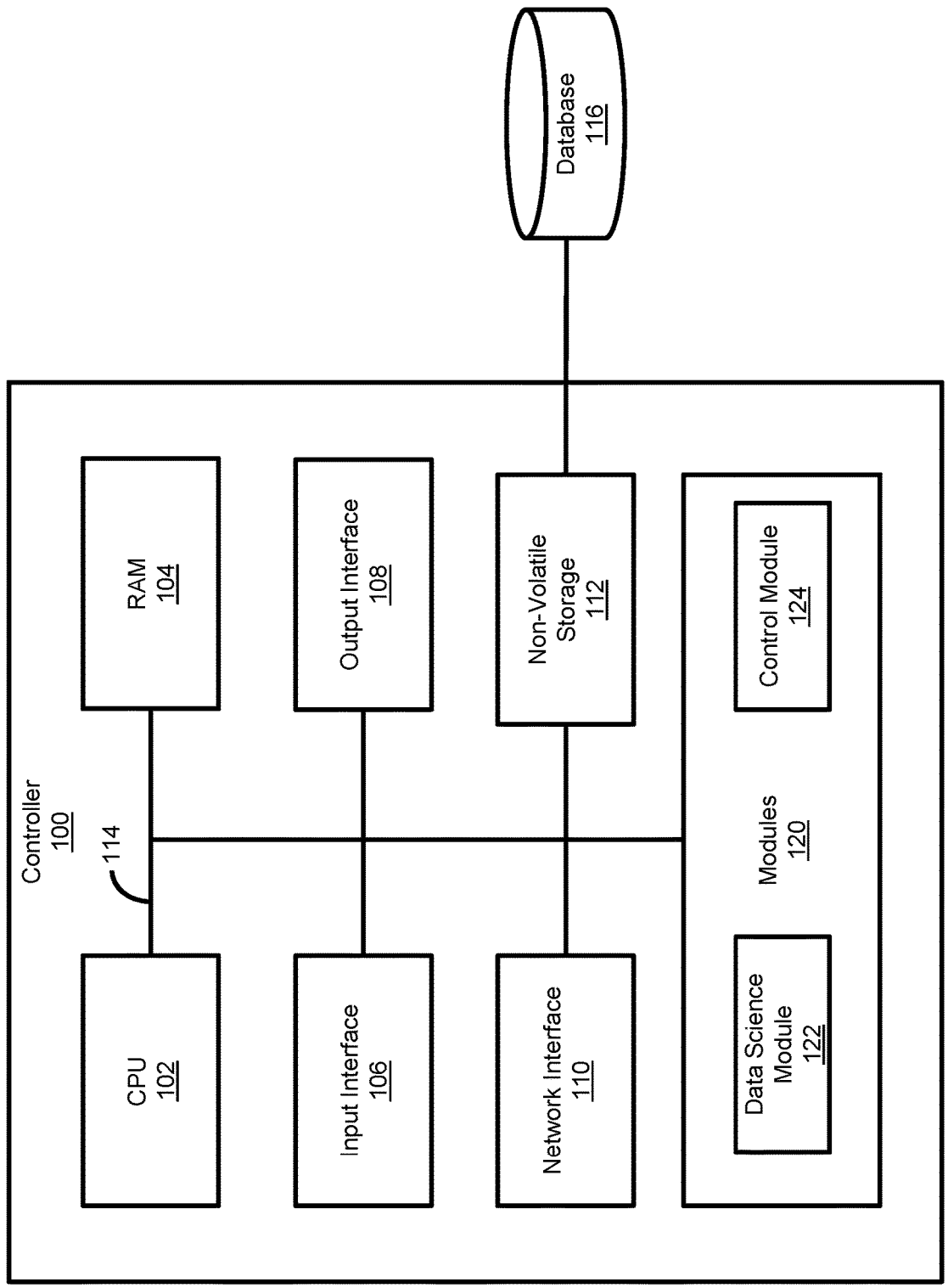
FIG. 3 shows a controller for decortication processing, in accordance with an embodiment.

Referring now to FIG. 3, shown therein is a controller 100 for decortication processing, in accordance with an embodiment.

The controller 100 can be executed on a suitable computing device; for example, a desktop computer, a laptop computer, a microcontroller, a programmable logic controller, a field-programmable gate array, a server, or the like.

FIG. 3 shows various physical and logical components of an embodiment of the controller 100. As shown, the controller 100 has a number of physical and logical components, including a central processing unit ("CPU") 102, random access memory ("RAM") 104, an input interface 106, an output interface 108, non-volatile storage 112, and a local bus 114 enabling CPU 102 to communicate with the other components. In some cases, the controller 100 also includes a network interface 110 to communicate with other devices via a network, such as a local area network or the Internet. CPU 102 executes an operating system, and various modules 120, as described below in greater detail. RAM 104 provides relatively responsive volatile storage to CPU 102. The input interface 106 enables an administrator or user to provide input via an input device, for example a keyboard and mouse. The output interface 108 outputs information to output devices, such as a display and/or speakers. Non-volatile storage 112 stores the operating system and programs, including computer-executable instructions for implementing the operating system and modules, as well as any data used by these services. During operation of the controller 100, the operating system, the modules, and the related data may be retrieved from the non-volatile storage 112 and placed in RAM 104 to facilitate execution.

Additional stored data can be stored in a database 116. In an embodiment, the database 116 can store various data related to decortication processing. As an example, such data can include any one or more of: operating data, customer related data, and operations management data.

Operating data can include, for example:
trucking card data;
scale ticket data;
bale/lot/load quality info (for example, chemical composition, moisture content, retting extent);
SCADA system info (for example, field instruments and process-integrated advanced sensors);
operator logsheets; and
quality assurance/quality control test data.
Customer related data can include, for example:
order quantities;
product specifications;
accounts receivable;
order cycle; and
date order must be received.
Operations management data can include, for example:
production scheduling;
supply management (for example, purchasing, logistics, inventory);
product management (for example, inventory, logistics);
finance;
human resources; and
sales and marketing.

In an embodiment, as described in more detail in the following, the controller 100 includes various modules 120; including a data science module 122 and a control module 124. In some cases, some or all of the various modules 120 can be combined, be executed remotely on a server-side device, or be executed on other components of system 200 (as described below). In some cases, some or all of the various modules 120 can be executed remotely on a server-side CIM device, such as CIM server 640 (as described in FIGS. 6-10).

Figure 4:
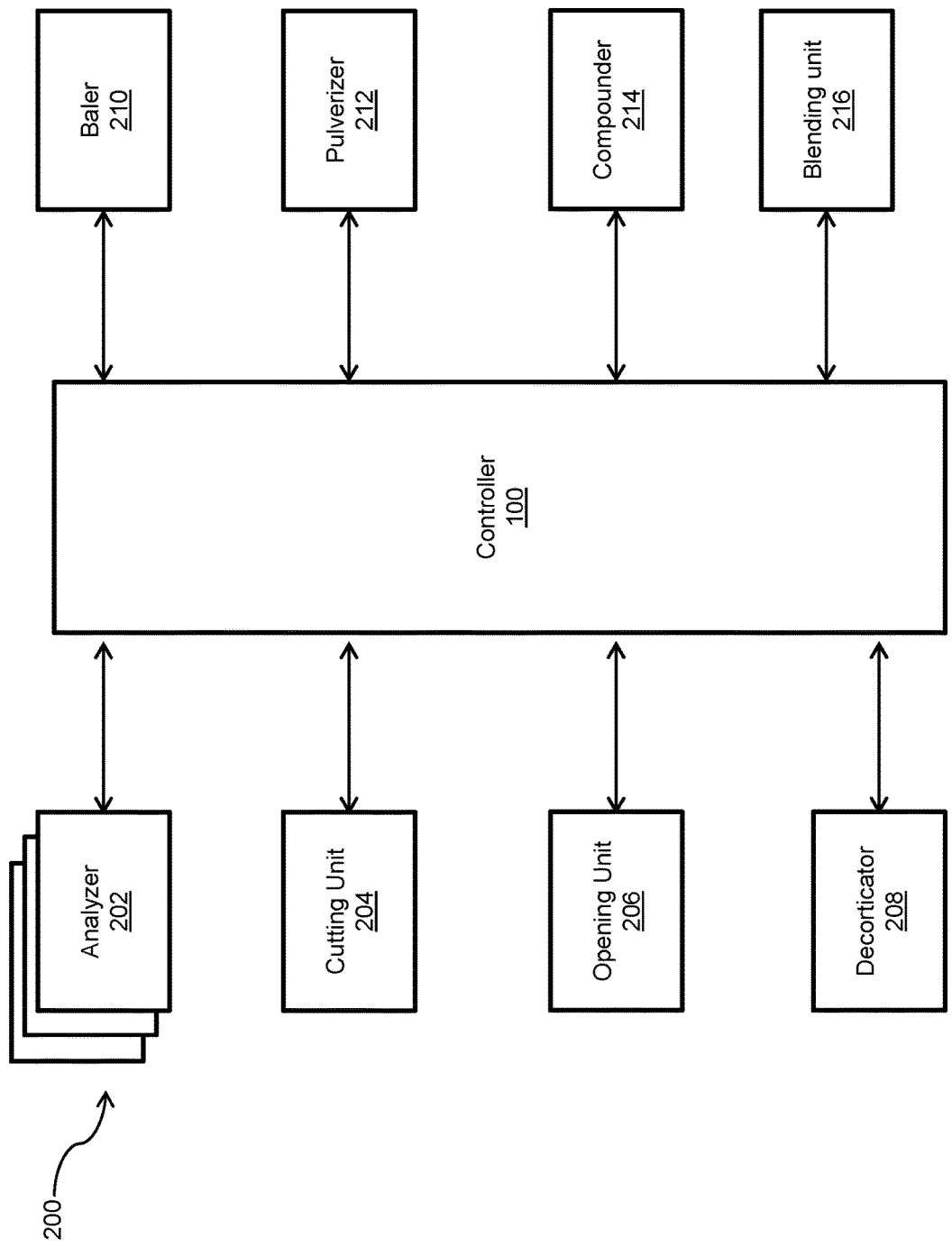
FIG. 4 shows a system for decortication processing, in accordance with an embodiment.

FIG. 4 illustrates a system 200 for decortication processing, according to an embodiment. The system 200 includes the controller 100 in communication with one or more analyzers 202, a cutting unit 204, an opening unit 206, a decorticator 208, a baler 210, a pulverizer 212, a compounder 214, and a blending unit 216. In an embodiment, the control module 124 coordinates and/or controls the decortication process by providing instructions to, and receiving feedback from, the other components of the system 200.

In some cases, the analyzers 202 can incorporate one or more sensors. In further embodiments, some or all of the components of the system 200 may communicate directly with each other.

Figure 5:
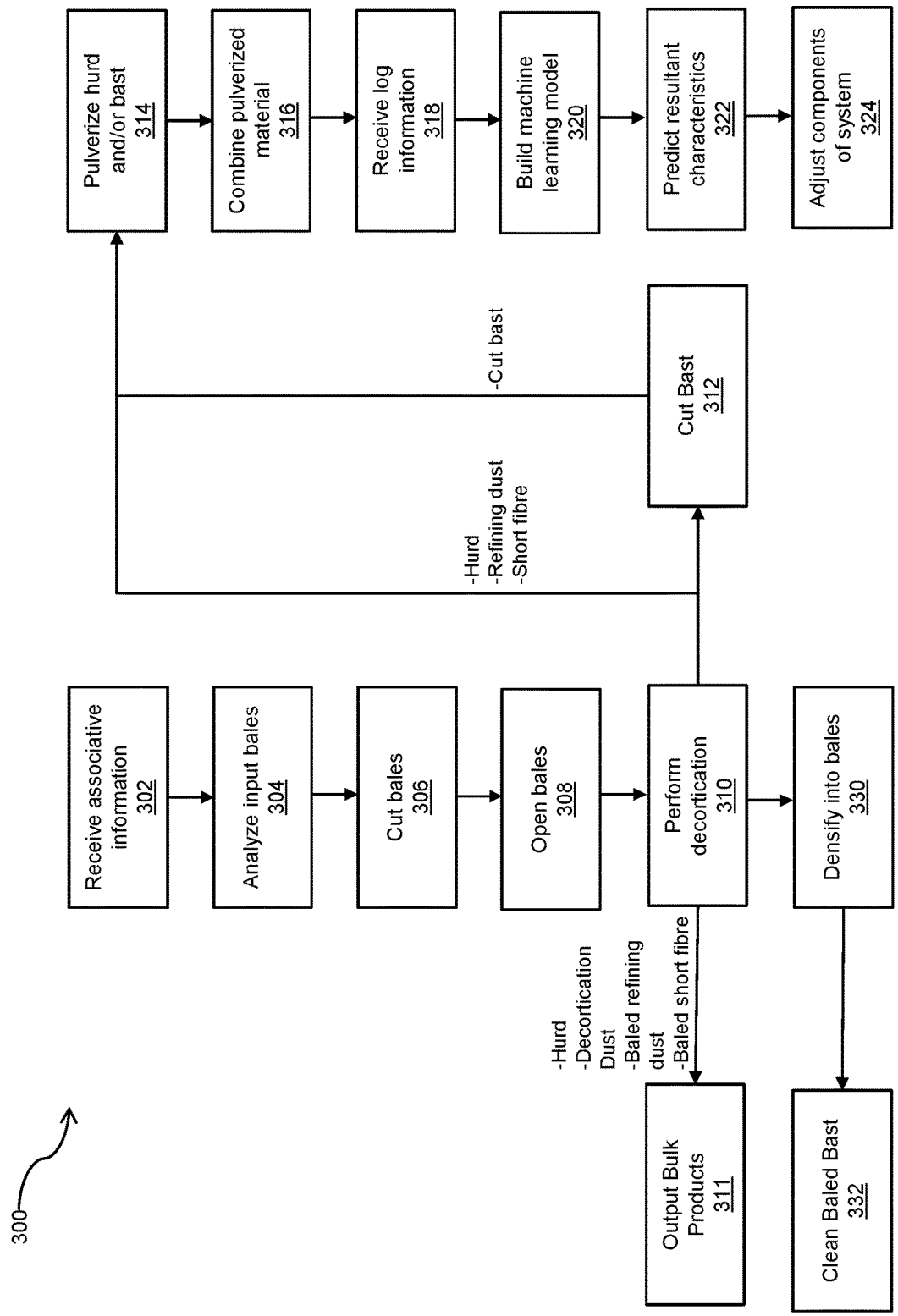
FIG. 5 shows a method for decortication processing, in accordance with an embodiment.

Referring now to FIG. 5, shown therein is a method 300 for decortication processing, according to an embodiment.

At block 302, the input interface 106 is used to receive associative information relating to one or more input units of hemp. In some cases, the input unit can be input bales, input lots, input truckloads, or the like. For the purposes of this disclosure, input units will be described as input bales. These are typically units of hemp brought to a processing facility. The associative information can include, for example, load weights, field location, crop variety/year, names of those involved in growing, swathing, baling, loading, or trucking of the bales, where the bales are stored, a bale number identifying the supplier of the bale (directing the system to data about that farmer and their crop), or the like.

At block 304, one or more of the analyzers 202 analyze the input bales. In a particular case, such analysis includes weighing, sampling and/or scanning. In some cases, the analyzer 202 can be a Vis-NIR spectrometer. In some cases, the analyzer 202 can be a densitometer, for example, to locate internal rocks or metal pieces. In some cases, the analyzer 202 can be a hygrometer to measure moisture content. In some cases, the analyzer 202 can be an optical scanner to measure, for example, the diameter of the stalk being processed. The analyzer 202 can communicate the results of the analysis to the controller 100 to be linked with each particular bale in the database 116. The analysis data can be communicated to the data science module 122 as described herein.

In some cases, the analysis of input bales includes determining chemical composition of the bales; for example, determining a percentage of bast, a percentage of hurd, and/or a percentage of other components. In some cases, the analysis of input bales includes determining retting extent; for example, determining power consumption and/or potential bast purity. In some cases, the analysis of input bales includes determining moisture content; for example, determining potential power consumption and/or potential fibre length. In some cases, the bale may be sorted and segregated based on its qualities determined above for later selection according to a particular use.

For example, when the control module 124 calls for textile grade bast fibres at 98% purity and 1.25" fibre length, the database 116 is accessed by the control module 124, or another element of the controller 100, to see what materials, for example those in the stacking yard, are best suited to make this product and what hurd product(s) are best made at the same time to maximize system profitability, and how best to configure all processing systems to minimize off-spec material produced in grade transitions. In an example, textile-grade bast fibres should generally be consistently retted, which may preclude some applications for the corresponding hurd (for example, horse bedding). In this way, the control module 124 can not produce such other applications while running, for example, textiles. In another example, if a large textile order is received that needs to be filled quickly, consistently-retted bales having a high cellulose content (signifying high bast content) may be preferred for throughput reasons. This material will generally produce less hurd, therefore the hurd-based throughput must either be decreased, or hurd inventories must be increased before starting the decortication process.

At block 306, the cutting unit 204 cuts the bales, for example, as described in more detail herein with respect to the breakage stage 54.

At block 308, the opening unit 206 opens the bales, for example, as described in more detail herein with respect to the breakage stage 54.

At block 310, the decorticator 208 performs decortication on the opened bales, for example, as described in more detail herein with respect to the decortication stage 56.

At block 311, in some cases, bulk products can be outputted by the controller 100. For example, one or more of hurd, decortication dust, baled refining dust, or baled short fibre can be outputted.

At block 330, the baler 210 densifies technical fibres into bales, for example, as described in more detail herein with respect to the fibre baling stage 58. In some cases, one or more of the analyzers 202 can analyze the retting extent, chemical composition and/or moisture of the bales; for example, using a Vis-NIR analyzer. Such analysis can be fed into the data science module 122 for feedback process control and/or straw selection for product-specific use. In some cases, the collection of all bale data is carried out so that the data may be used to control the selection and processing of individual bales to achieve specific product outcomes. The baled blast can then be cleaned as desired at block 332.

In some cases, the blending unit 216 can blend hurd, short fibre and cut bast into proportions as determined by the control module 124 as described herein.

At block 312, bast outputted from the decortication at 310 can be cut to a desired or specified length, as described herein. The cut bast, along with the other outputs of the decortication at block 310, hurd, refining dust, and short fibre, are delivered to the pulverizer 212 at block 314.

At block 314, the pulverizer 212 grounds and sieves hurd and/or bast, for example, as described in more detail herein with respect to the pulverizing stage 60. In some cases, one or more of the analyzers 202 can analyze the particle size distribution of the hurd; for example, using an image analyzer. Such analysis can be fed into the data science module 122 for feedback process control and/or quality assurance/quality control. In some cases, one or more of the analyzers 202 can analyze the chemical composition of the pulverized hurd and/or bast; for example, using a Vis-NIR analyzer for the hurd or a continuous flexural analyser for the bast. Such analysis can be fed into the data science module 122 for feedback control of the decortication process to reach target purity, for feed-forward control of cutting unit 204 to reach target flexural strength, and/or for straw selection for a product-specific use.

Generally, flexural strength will be proportional to bast length and bast content. Lowest possible strength will be when only pulverized hurd is present. Full product specifications must be known in order to optimize hurd geometry, which impacts bond area and bulk density.

At block 316, the compounder 214 combines the pulverized materials with thermoplastic polymers into a resultant product comprising a pellet or extruded shape of uniform appearance and composition, for example, as described in more detail herein with respect to the compounding stage 62. In some cases, one or more of the analyzers 202 can analyze the flexural strength of extruded material; for example, using a flexural tester. Such analysis can be fed into the data science module 122 for feedback control of cutting unit 204 to reach target flexural strength and/or quality assurance/quality control. In an embodiment, reaching target flexural strength or quality control can achieved by increasing bast content or increasing bast length.

In some cases, at block 318, the data science module 122 receives log information from the input interface 106 inputted by an operator or user.

At block 320, the data science module 122 builds a machine learning model using training data comprising data from the one or more of the analyzers 202 and/or input interface 106. The machine learning model builds interrelationships between characteristics of the resultant product and characteristics of the input bale and/or operating conditions. At block 322, once the machine learning model is sufficiently mature, having received sufficient training data, the control module 124 can use the machine learning model to predict characteristics of the components or of the resultant product based on characteristics of the corresponding input bale and operating conditions. In some cases, such characteristics can include the expected output volume of the resultant product, quality of the resultant product, and time required to produce the resultant product.

In a particular case, the machine learning model can be developed using supervised learning techniques. The supervised learning techniques generate a model by learning relationships and dependencies between the outputs and input features from example data sets. The datasets used for training a supervised machine learning model comprise of labeled examples where input and desired outputs are known in advance. In some cases, supervised learning techniques that be used include, for example, Nearest Neighbor, Naive Bayes, Decision Trees, Linear Regression, Support Vector Machines (SVM), Neural Networks.

In another case, the machine learning model can be developed using unsupervised learning techniques. The unsupervised models can be trained with unlabeled data. These techniques detect patterns to compute a measure of similarity (or dissimilarity) with other data points and summarize or group the data points that may provide meaningful insight into the data. In some cases, unsupervised learning techniques that be used, for example, include k-means clustering, hierarchical clustering, generative adversarial networks, and autoencoders.

In other cases, the machine learning model can be developed using semi-supervised learning techniques. The semi-supervised techniques fall in between the supervised and unsupervised techniques. The input data for semi-supervised learning is mainly unlabeled but comprises of a small exemplar labeled set which serves as "seed" for guiding and growing clusters. In some cases, semi-supervised learning techniques that be used, for example, include generative models, transductive SVM, and graph based methods.

In some cases, the machine learning model can be a developed using reinforcement learning techniques. Reinforcement learning techniques are generally neither supervised or unsupervised. Reinforcement learning techniques attempt to determine an ideal response within a specific context in order to maximise its performance by retro-feeding the so-far-learned model in order to further improve by learning from its mistakes. Reinforcement learning does not rely strictly on set of labeled data set for learning. Rather, it relies on being able to monitor the response of the actions taken, and measure against a definition of a reward. In that regard, it may be treated as learning via exploring. In some cases, semi-supervised learning techniques that be used, for example, include dynamic programming, Q-learning, temporal difference and deep adversarial networks.

In a particular case, the machine learning model can be a regression-type model, for example, Linear Regression, Logistic Regression, Polynomial Regression, Stepwise Regression, Ridge Regression, Lasso Regression, ElasticNet Regression, Multi-layer perceptron based Regression, Partial least square Regression, Regression Trees, and Support vector machine Regression. The regression model selected may depend on the number of independent variables, shape of the regression line and the type of dependent variable. Initial training data for the model can be comprised of laboratory tests done during an engineering phase of development of the controller 100. In this case, training data can be generated over the start-up/commissioning period, and in some cases, over an initial period (for example, 3 months) of operation by concurrent field sensor measurements and laboratory analysis for output attributes described herein. In this way, time-stamped lab data from manual samples obtained at the sensor location can be manually entered into the database as a "reference", "ground-truth", or "calibration" point.

In some cases, an ensemble of machine learning models may be used, such as multiple regression techniques or other techniques running simultaneously. The ensemble may be homogeneous or heterogeneous. A homogeneous ensemble comprises a plurality of classifiers of the same machine learning type (for example, multiple support vector machines). Each model in a homogeneous ensemble may have different parameter values and may be trained using a distinct subset of the samples in the training set. A heterogeneous ensemble comprises a plurality of models belonging to a variety of machine learning techniques; for example, a regression model, a K-means clustering, and an SVM. Models in heterogeneous ensembles may be trained on the same training data or on distinct subsets of the training data. If a multiplicity of a machine learning techniques exists in a heterogeneous ensemble, each instance of the multiplicity may be trained on some samples unique only to that instance.

At block 324, the control module 124 can use the machine learning model to adjust one or more aspects of the other components of the system 200 to achieve a desired resultant product. As an example, adjusting a chop length of the cutting unit 204 or adjusting decorticator speed of the decorticator 208. In a particular case, if flexural strength must increase but bast inventory is not sufficient (for example, because materials have lower bast content), then chop length will be increased. If baler spectrometry sensor indicates low purity but moisture content is on target, decorticator speed can be increased to improve cleanliness.

Figure 6:
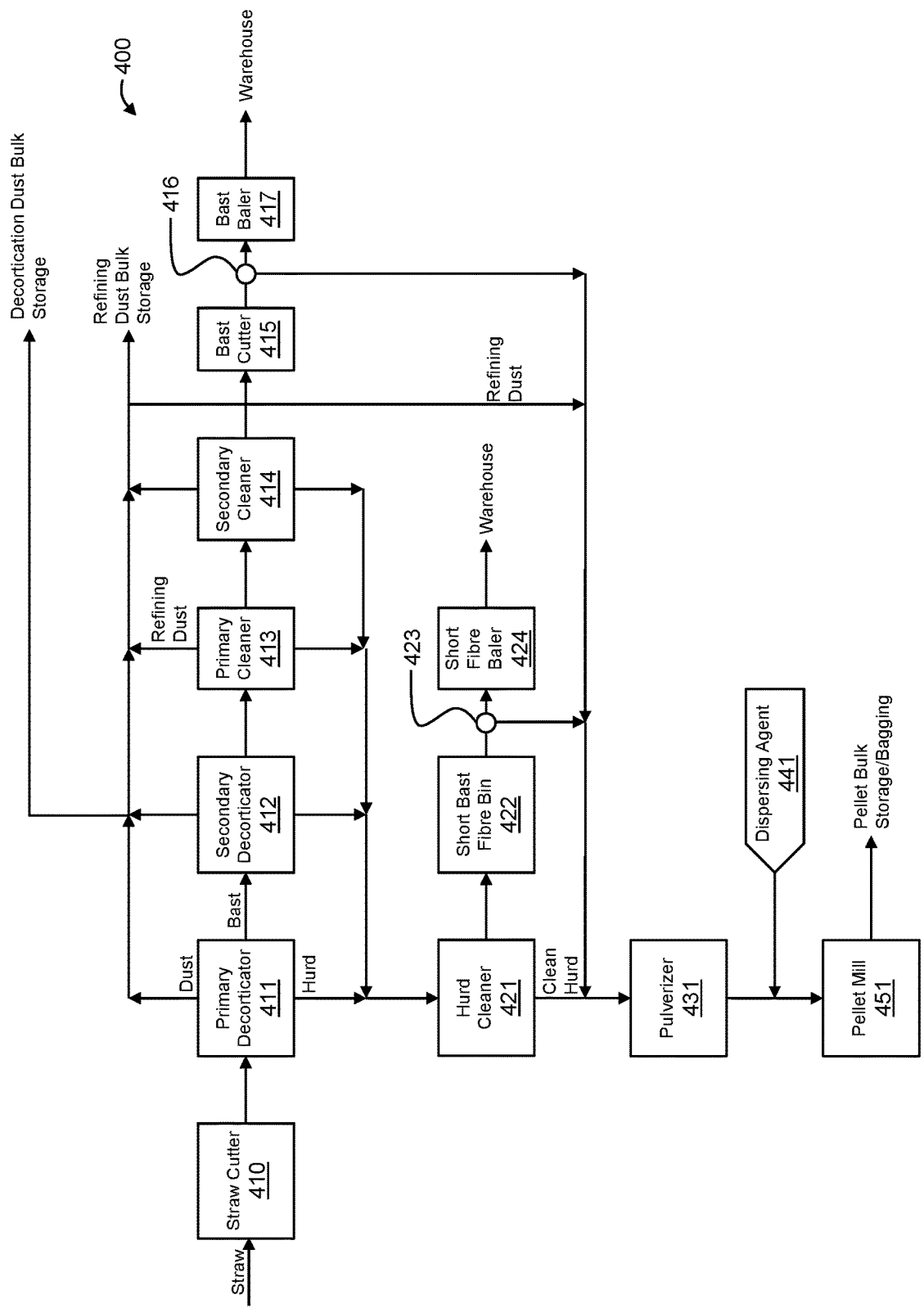
FIG. 6 diagrammatically illustrates material flow in an exemplary decortication process.

FIG. 6 diagrammatically illustrates material flow in an exemplary decortication method 400, according to an embodiment. A primary decorticator 411 obtains straw (e.g., raw material for decortication, also known as the stems or stalks) from a straw cutter 410 which has cut the straw to a specified length. The primary decorticator 411 separates the straw into bast and hurd, leaving dust as a potentially useable by-product. The primary decorticator 411 sends the dust to dust bulk storage, the bast to a secondary decorticator 412, and the hurd to a hurd cleaner 421. The secondary decorticator further separates the straw into bast and hurd, leaving dust as a potentially useable by-product. The secondary decorticator 412 sends the dust to dust bulk storage, the bast to a primary cleaner 413, and the hurd to the hurd cleaner 421. The primary cleaner 413 cleans the bast, separating out some remaining hurd and leaving dust as a by-product. The primary cleaner 413 sends the dust to dust bulk storage, the bast to a secondary cleaner 414, and the hurd to the hurd cleaner 421. The secondary cleaner 414 cleans the bast, separating out some more remaining hurd and leaving dust as a potentially useable by-product. The secondary cleaner 414 sends the dust to dust bulk storage, the bast to a cutter 415, and the hurd to the hurd cleaner 421. The cutter 415 cuts the bast. The cutter 415 sends a first portion, for example most of the cut bast, to a baler 417 and a second portion, for example the remainder of the cut bast, to be re-blended 416 back into the hurd to improve mechanical performance. Re-blending can be done via volumetric metering of each component, whereby higher bast content or longer bast fibres generally increases mechanical performance. In some cases, the baler 417 bales the bast and sends the bast to a warehouse.

In this exemplary method, the hurd cleaner 421 receives hurd of various lengths and cleanliness. The hurd cleaner 421 cleans the hurd to remove short bast fibres. The hurd cleaner 421 sends the clean hurd to the pulverizer 431 and any short bast fibres to a short bast fibre bin 422. The short bast fibre bin 422 sends a first portion, for example most of the short bast fibres, to a baler 424 and a second portion, for example the remainder of the short bast fibres, to be re-blended 423 back into the hurd to improve mechanical performance. In some cases, the baler 424 bales the short bast fibres and sends them to the warehouse.

In this exemplary method, the pulverizer 431 receives the clean hurd, the re-blended long bast fibres, and the re-blended short bast fibres (together "three materials"). The pulverizer 431 pulverizes the three materials together into a powder-like form. The pulverizer 431 pelletizes the powders using a dispersing agent 441. The dispersing agent 441 may be liquid and compatible with the natural polymer that is used in subsequent compounding. The pulverizer 431 sends the pellets to a pellet mill 451. The pellet mill 451 sends the pellets to pellet bulk storage/bagging.

During the decortication process, there may be compounding and profile extrusion of trim, baseboards, casings, moldings, and other such products. There may also be continuous mechanical testing of extruded profiles, with feedback that controls the addition of short and long bast fibres.

Figure 12A:
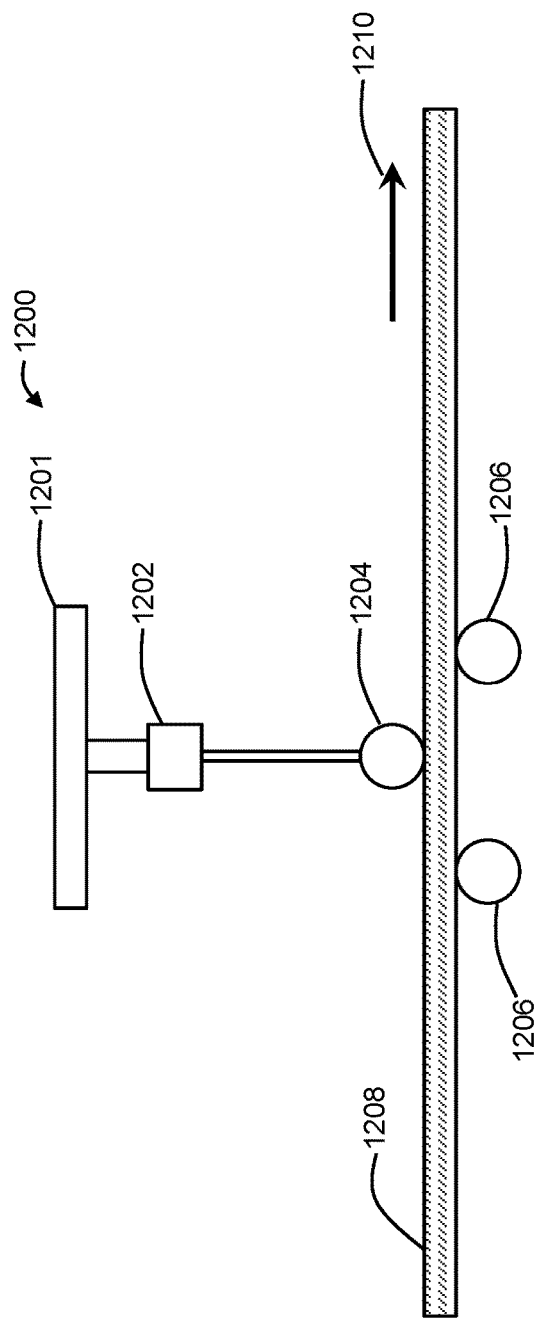
FIG. 12A illustrates a front diagrammatic view of a dynamic flexural tester according to an embodiment.
Figure 12B:
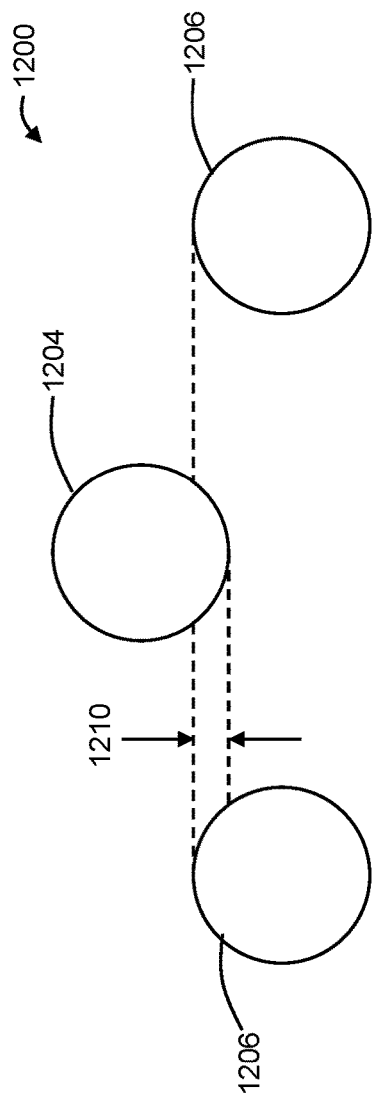
FIG. 12B illustrates close-up front diagrammatic view of the dynamic flexural tester of FIG. 12A.

In an example of mechanical testing, a continuous dynamic flexural tester 1200, as shown in FIGS. 12A and 12B can be used. The flexural tester 1200 can perform tests on material 1208 having profiles of fixed geometry, such as the material coming out of the end of the extrusion line. The material 1208 traverses three rollers, two lower fixed rollers 1206 and one upper moveable roller 1204, as shown by direction arrow 1210. The horizontal distance between each of the rollers is known. The upper roller 1204 is moveable along the vertical axis. A mechanical positioner 1201 is mechanically connected to the upper roller 1204 and, during testing, applies a downward force on the upper roller 1204 until it reaches a predetermined "beam deflection" distance 1210. In between the mechanical positioner 1201 and the upper roller 1204 is a load cell 1202. For a certain "beam deflection" distance 1210, the force measured by the load cell is proportional to the flexural strength of the material. In this case, if the force is above a desired threshold, the control module 124 can reduce bast content or reduce length, and vice versa.

Figure 7:
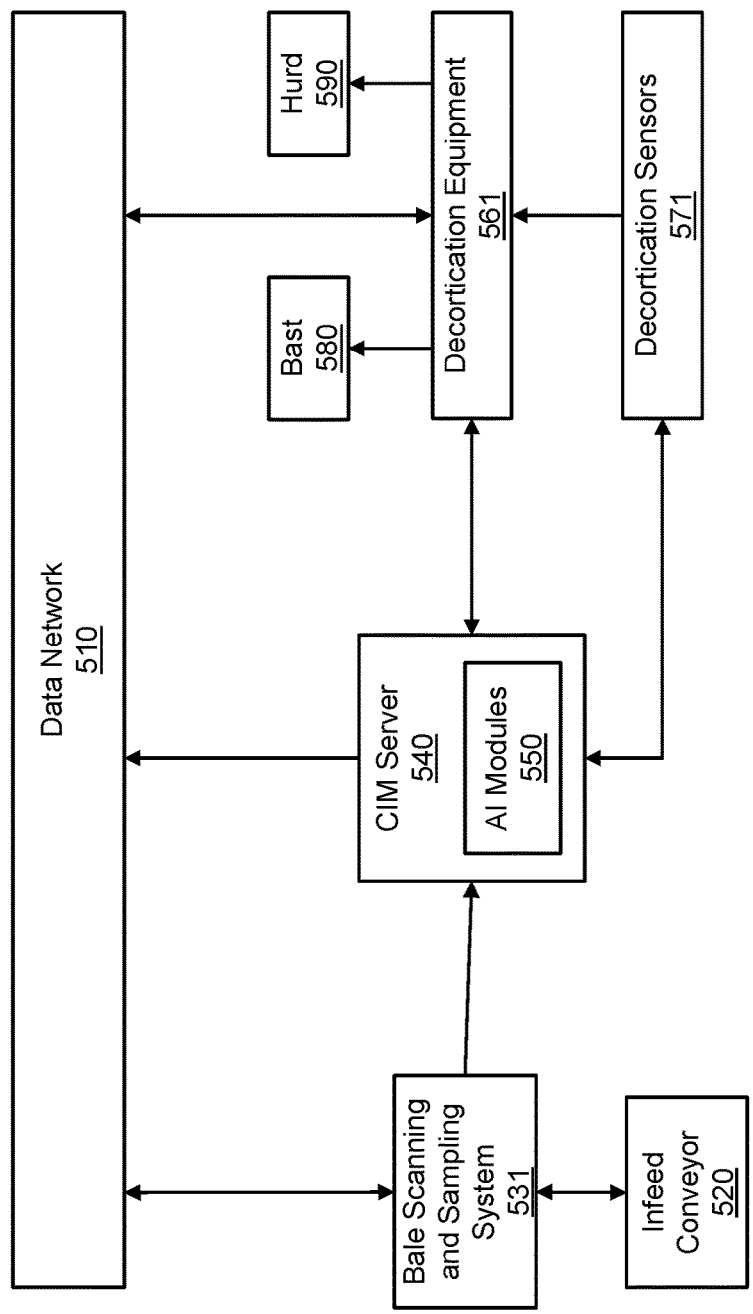
FIG. 7 illustrates an example production flow at the input stage.

FIG. 7 diagrammatically illustrates an example production flow 500 at the input stage in an exemplary decortication system, according to an embodiment. In this case, the various elements of the production flow 500 can communicate over a data network 510. In production flow 500, bales of stalk (for example, with individual ID numbers already marked on them) are brought into the plant and placed on an infeed conveyor 520. A bale scanning and sampling system 531 identifies the tagged ID associated with a given bale so that its component materials can be tracked throughout processing in the controller 100. Samples can be taken of the incoming bales, as described herein; for example, Vis-NIR data, moisture probe data, air pressure probe data. This sampling data can be used by the data science module 122 to associate ultimate output characteristics to the input sample characteristics of a given bale. This input data can then be used to train a machine learning model to predict output characteristics. The sampling can include inserting a mechanical probe into the middle of the bale to extract a core sample. A Vis-NIR scanner may review the core sample to determine the relative quality of the fibre inside the bale of stalk. bale scanning and sampling system 531 may include an AI module of its own or be connected to an external AI module, such as data science module 122. There may also be a moisture scanner built into the system such that if the sensor indicates the moisture in a bale is too high, the entire system will automatically slow itself down to avoid ripping stalk fibres.

Quality information is tagged onto the ID number of the bale for tracking/traceability throughout the inventory and production process. Tagging can be, for example, a bar code, an RFID chip, or the like. In an example of the control module 124, a CIM server 540 can be used to determine when certain products are to be made. The CIM server 540 can then scan the inventory system to "find" which bales are "predicted" to be most apt to provide the most appropriate quality of stalk for the expected outputs. One or more artificial intelligence (AI) modules 550, each part of the data science module 122, can be used to generate the prediction. In some cases, the CIM server 540 can be its own module or component of the controller 100.

Decortication sensors 571 monitor operating metrics of decortication equipment 561 (for example, pumps, motors, drives, or the like) to monitor production and material handling equipment in order to interrupt any problems in the decortication equipment 561 which could cause a bottleneck, jam the line, or cause a production line shutdown. The decortication sensors 571 may be connected to the CIM server 540 via a Bluetooth (or other suitable) connection. The decortication equipment 561 can produce bast 580 and hurd 590.

Figure 8:
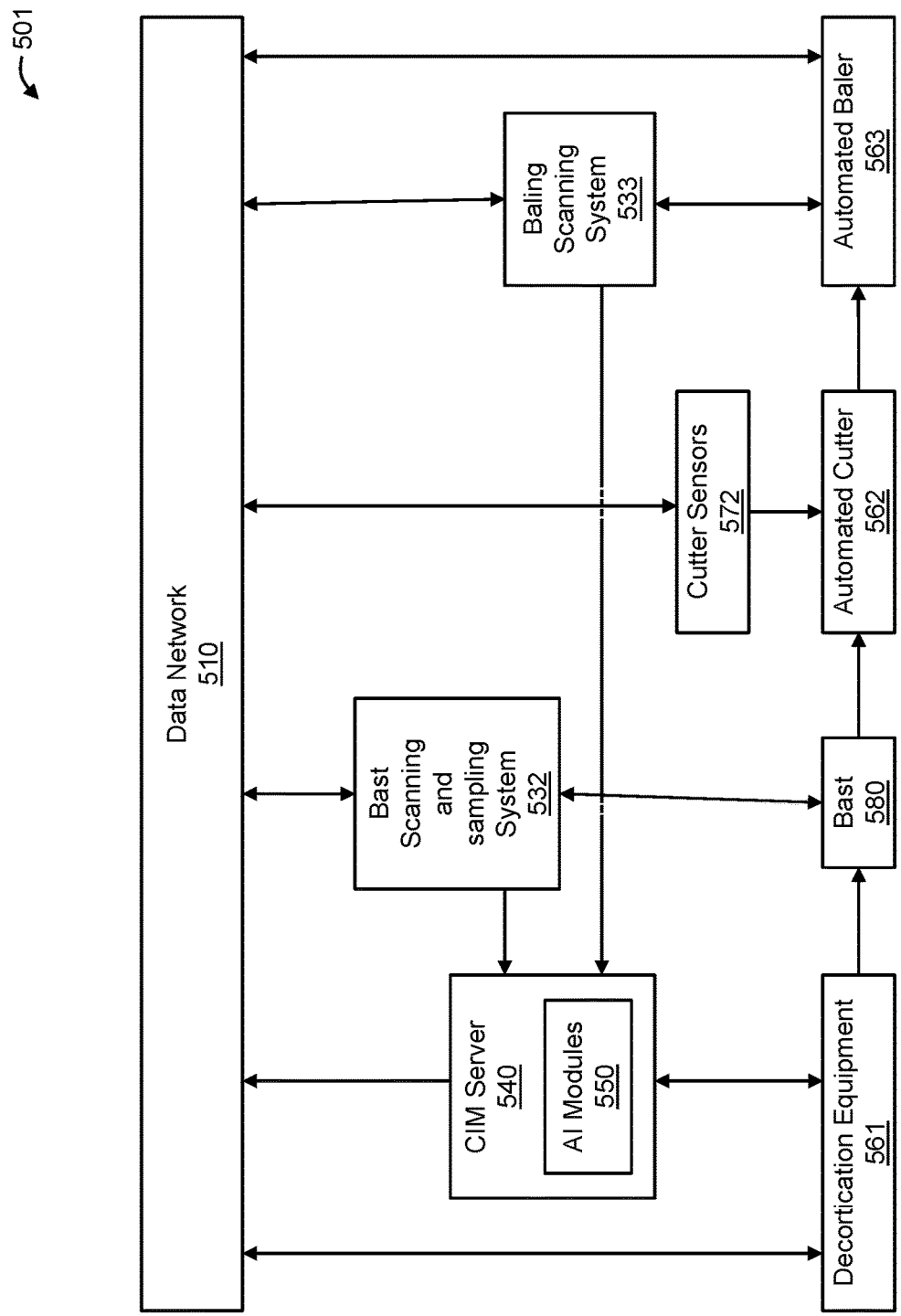
FIG. 8 illustrates an example production flow at a bast production stage.

FIG. 8 diagrammatically illustrates an exemplary production flow 501 at a bast production stage in an exemplary decortication system, according to an embodiment. In production flow 501, material goes through the decortication equipment 561 and is converted partly into bast 580. The quality level indicated in the bale can direct the output of the length of the bast fibre to be prepared by an automated cutter 562 (for example, a Pierret cutter), which, in some cases, can a custom automated bast cutting equipment with optimization capabilities. In some cases, for low quality input material, bast can be cut short, and for high quality input material, bast can be cut into long lengths depending on applications of the bast. Quality will generally depend on the outputted product. For example, for textiles, high quality can be material that is well-retted having high cellulose, and for animal bedding, high quality can be material that is unretted having low cellulose. In an example, long length can be between 6-8" and short length can be under 1".

A bast scanning and sampling system 532 can scan the bast 580 before being delivered to the automated cutter 562. Cutter sensors 572 monitor operating metrics of the automated cutter 562. The cutter sensors 572 may be connected to the CIM server 540 via a Bluetooth (or other suitable) connection. The second sensor 572 can be, for example, weight sensors, level indicators, motor loads, flexural tester (E/IM), temperature sensors, pressure sensors, or any process sensor. The automated cutter 562 delivers the cut bast to an automated baler 563, which may be, more generally, a bast bundling unit. The baler 562 can be, for example, a cardboard baler, a vertical or horizontal bagging line, or the like. A baling scanning system 533 can scan the contents of a bale of bast. The baling scanning system 533 may utilize a Vis-NIR scanner embedded in the compression head of the automated baler 563: every time it pushes down to compress the bundle, the Vis-NIR unit in the head is triggered and scans the top row of bast on the bundle. The bast scanning and sampling system 532 and the baling scanning system 533 each (or both) can include an AI module of its own or be connected to an external AI module, such as the data science module 122. The CIM server 540 communicates with the decortication equipment 561 and receives scanning data from the bast scanning and sampling system 532 and/or the baling scanning system 533.

Figure 9:
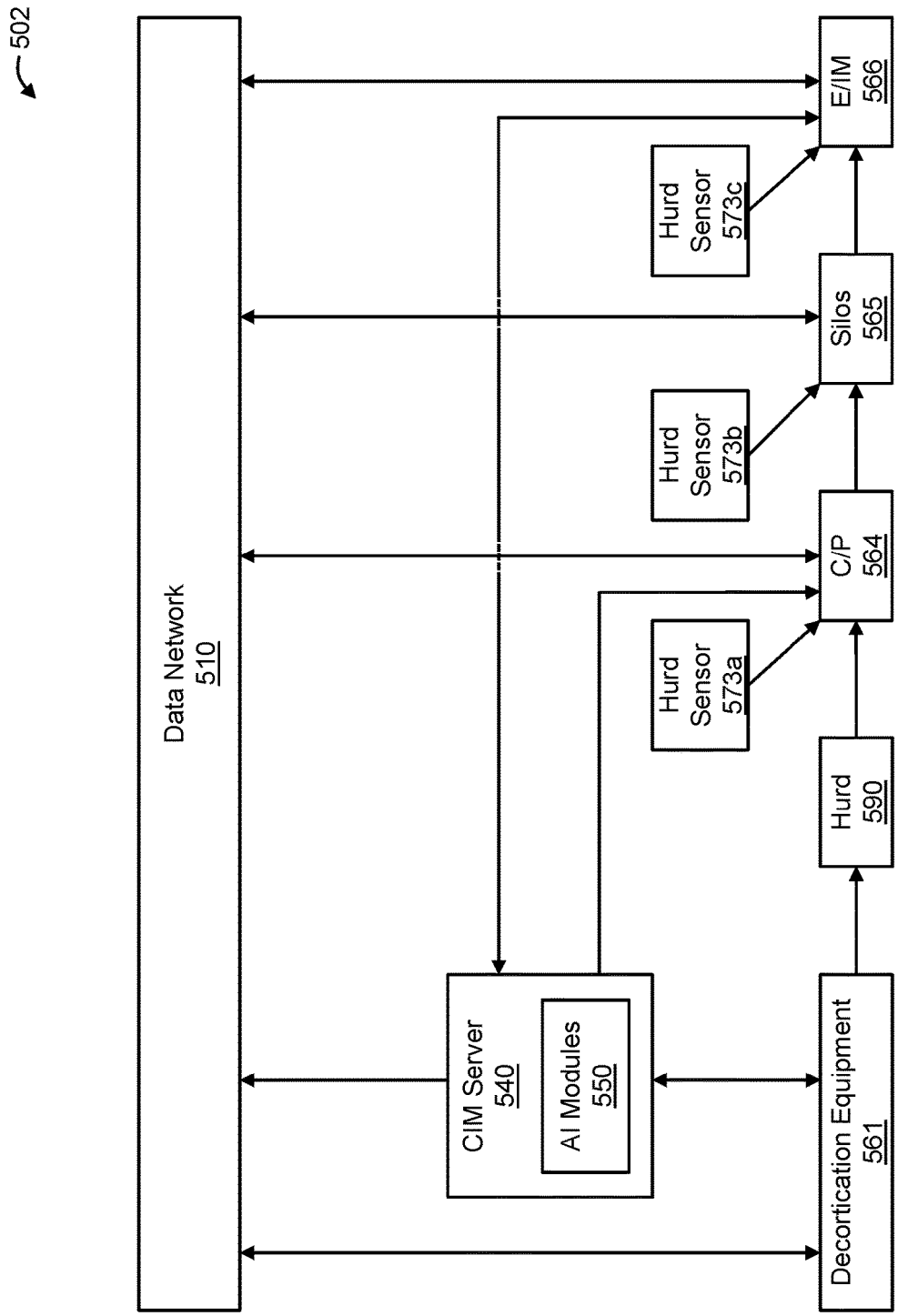
FIG. 9 illustrates an example production flow at a hurd production stage.

FIG. 9 diagrammatically illustrates an example production flow 502 at a hurd production stage in an exemplary decortication system, according to an embodiment. In production flow 502, material goes through the decortication equipment 561 and is converted partly into hurd 590. A compounder/pelletizer 564 compounds and/or pelletizes the hurd 590. The resultant bio-pellets can be stored in bio-pellet storage silos 565. Some or all of the bio-pellets are delivered to extruders/injection molders 566. One or more hurd sensors 573 (in this example illustrated at three hurd sensors 573a, 573b, and 573c) monitor metrics at different locations of hurd processing. The hurd sensors 573 may be connected to the CIM server 540 via a Bluetooth (or other suitable) connection. For example, a first of the hurd sensors 573a can monitor operating metrics of the compounder/pelletizer 564, a second of the hurd sensors 573b can monitor operating metrics of the bio-pellet storage silos 565, and a third of the hurd sensors 573c can monitor operating metrics of the extruders/injection molders 566. The CIM server 540 communicates either directly or through the data network 510 with the decortication equipment 561, the compounder/pelletizer 564, the bio-pellet storage silos 565, and/or the extruders/injection molders 566.

In some embodiments, the scanning systems 531, 532, 533 can be, for example, a 3D scanning system (e.g., to determine internal fibre characteristics); an OTC scanner; or an optical scanner (e.g., to determine shape and size). Other suitable scanning systems that perform analogous or complementary functions may also be used. In some embodiments, the sensors can be a densitometer (e.g., to measure density through a bale or a stalk); a hygrometer (e.g., to measure moisture content in a bale or a stalk); or a photon sensor. Other suitable sensors that perform analogous or complementary functions may also be used.

Figure 10:
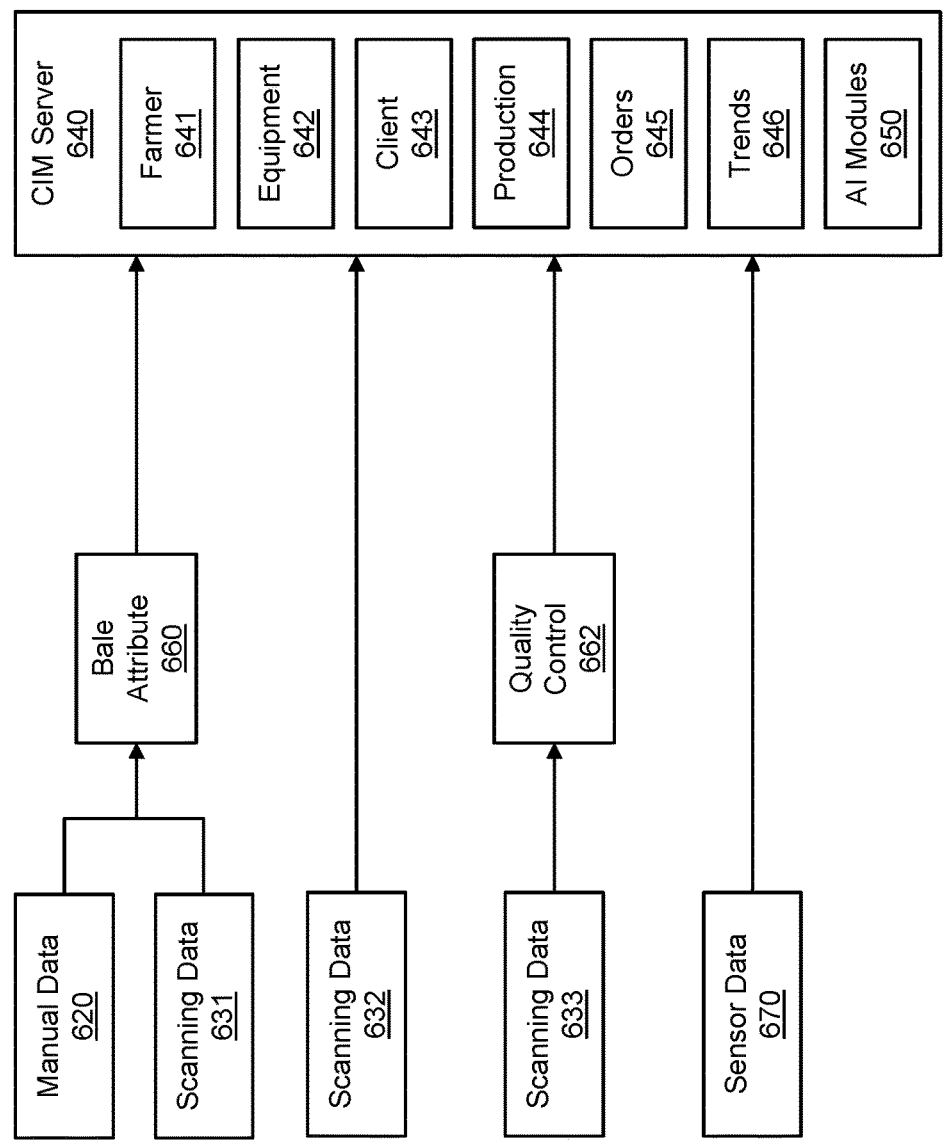
FIG. 10 illustrates an example logic flow.

FIG. 10 diagrammatically illustrates example logic flow 600 in an exemplary decortication system, according to an embodiment. Logic flow 600 shows various considerations which the AI modules 650, combined with the other considerations, address to make real-time processing decisions. The AI modules 650 being part of the data science module 122. Manual data inputs 620 can be combined combine with first scanning data 631 to arrive at a bale attribute 660, based on information obtained and processed by a CIM server 640 as part of the controller 100. If the attribute 660 meets production requirements (for example, fraction yields, throughput, and product quality), then it will be selected. The manual data inputs 620 (which can provide the basis of a farmer file) include variables entered as data for yield analysis. The variables may include, for example, a registration number, the varietal used, date of plantation and/or harvesting, irrigation history, fertilization history, and average yield per bale. The first scanning data 631 may include, for example, ID numbers and contaminant information (from which preliminary fibre order-matching may be derived). The bale purpose 660 may be, for example, a desired, expected, or predicted fibre quality in a bale (e.g., premium, basic, etc.). Second scanning data 632 may contain information on the characteristics of pre-cut bast. Third scanning data 633 may contain information on the characteristics of baled bast. The third scanning data 633 provides information related to quality control 662, which is then communicated to the CIM server 640. Sensor data 670 from the various sensors in the system is communicated to the CIM server 640. The sensor data 670 may contain information on, for example, the operation of the decortication equipment, the automated cutter, the automated baler, the compounder/pelletizer, the bio-pellet storage silos, extruders, and injection molders.

The CIM server 640 has one or more files—these files are processed to automate functions of the decortication system. The files may include, for example, a farmer file 641, an equipment file 642, a client file 643, a production file 644, an open orders file 645, and a trends/statistics file 646. The farmer file 641 keeps a running control on quality of stalk by tracking each bale processed for yield and contaminants; and provides farmer supply traceability. The equipment file 642 monitors motors, pumps, and valves to anticipate operational problems; automatically controls production; automates maintenance scheduling; and stores data to achieve AI-based machine learning. The client file 643 monitors each order to ensure that it is fulfilled according to the commitments made to a client, relative to specific, objective quality criteria, such as lead times, order quantities, and promised delivery dates. The production file 644 automatically plans production scheduling based on, for example: (a) matching outputs from scanned, input bales to match quality needs; and (b) fulfilling orders with 100% quality control, and on time. The open orders file 645 monitors production in real time and checks individual client orders against their master file criteria to ensure the requested results and delivery date are fulfilled. The trends/statistics file 646 monitors market trends and pricing to process the more desired valuable and preferred products for short-term inventory production based on historical trends and statistical opportunity. The AI modules 650 may use a "top-down, bottom-up" problem-solving process; they record and analyze all past production variables and their resultant "values" in order to "predict" future production outcomes. As part of the data science module 122, the AI modules 650 can build and use machine learning models to arrive at the predictions.

In some embodiments, the CIM server 640 uses some or all of its files at different stages of production, or even within each stage. When input stalk is conveyed to the decortication equipment 561, these files include, for example: the farmer file 641 (for quality and yield), the equipment file 642 (for maintenance and productivity), the client file 643 (for specifications, terms, and quantities), the production file 644 (for planned output), the open orders file 645 (for adjustments based on changes), and the trends/statistics file 646. When cut bast is delivered to the automated baler 563, these files include, for example: the farmer file 641 (for quality and yield), the client file 643 (for specifications, terms, and quantities), the production file 644 (for production), and the trends/statistics file 646. When the compounded/pelletized hurd is delivered to the bio-pellet storage silos 565, these files include, for example: the farmer file 641 (for quality monitoring and stalk yield), the equipment file 642 (for production and equipment monitoring/control), the client file 643 (for specifications and orders), the production file 644 (for production planning and scheduling), and the trends/statistics file 646. When the bio-pellets are delivered to the extruders/injection molders 566, these files include, for example: the equipment file 642 (for maintenance and productivity), the client file 643 (for specifications, terms, and quantities), the production file 644 (for planned output), the open orders file 645 (for adjustments based on changes), and the trends/statistics file 646.

Advantageously, as an example, the system 200 can preferentially select input bales based on desired product specifications or order volumes. As another example, the input bales can be selected based on desired bast purity requirements and/or end-use applications. In an exemplary case, input bales can be selected by receiving one or more orders, selecting raw materials that according to the machine learning models have produced the best product for the lowest cost, predict the yield of all fractions, look for other orders that can be filled with non-targeted fractions, and begin the decortication process.

As an example, the one or more of the analyzers 202 can be used to analyze the pulverized hurd to confirm hurd purity through chemical composition analysis. Such analysis can be used to close the component mass balance (in conjunction with Vis-NIR analysis on straw bales and clean bast product), functioning as calibration cross-check with other analyzers 202.

As an example, using the analysis of the data science module 122, the system 200 can determine how much chopped bast fibre is required in extruded product to achieve flexural strength targets. Whereby, for a defined extruded cross-section, flexural strength is typically a function of bast content, bast fibre length, pulverized particle size, and resin content in the extruded part.

As another example, based on continuous deflection testing (deflection distance and load) on extruded parts by one ore more of the analyzers 202, using continuous flexural testing, the controller 100 can control bast content. In general, if flexural strength fluctuates outside of control limits, the bast content is adjusted.

As another example, based on continuous deflection testing (deflection distance and load) on extruded parts by one or more of the analyzers 202, using the analysis of the data science module 122, the system 200 can adjust chop length of the cutting unit 204 to control flexural strength.

As another example, the data science module 122 can predict that the input stalk is relatively high in moisture for a desired characteristic of output fibre. This type of prediction may be part of standard model-predictive control, possibly informed by KDD. Thus, the control module 124 can instruct the system 200 components, such as the decorticator 208, to slow their respective throughput rate down, such as slowing the feed rate and/or saw speed. This can ensure that the fibre being processed from the stalk is not "damaged", for example by ripping the fibre, because it was processed too fast.

As another example, the data science module 122 can use the machine learning model to extrapolate correlations between data from the one or more analyzers 202 at different stages of the decortication process to conceptualize the characteristics of the resultant products; for example, having certain weight, strength, or the like. In a particular case, operating the system will generate data that will form the basis for machine learning models (for example, regression-based models). For the regression-based models, the regression curves can be extrapolated to predict output of the decortication process based on the input characteristics of the input material. In a particular case, operating into the extrapolated region can thus generate new data that is no longer extrapolated. Repeating this approach multiple times can lead to the discovery of new material capabilities and possibly new products.

In some embodiments, various data science or machine learning techniques can be used. The data science module 122, either supervised or unsupervised, aims to use the data received from the one or more analyzers 202 to optimize particular aspects of the decortication process. In this case, the received data represents a training set, upon which the data science module 122 uses to refine the machine learning model, which the control module 124 uses to control the components of the decortication process. A number of machine learning approaches can be used by the data science module 122. For example, the Long Short Term Memory (LSTM) neural network, GPNet, or a suitable alternative thereto, can be used by the data science module 122 to efficiently improve particular aspects of the decortication process. When the database 116 contains no or little data, the data science module 122 can start with a limited supervision model and then move to an unsupervised model as the database 116 grows. The training set can be generated during start-up and can be corroborated by lab analysis to back-up advanced sensors (e.g., Vis-NIR).

In some embodiments, the one or more analyzers 202 can include a humidity sensor probe in the air handling system to allow the controller 100 to control moisture before decortication. In some embodiments, the one or more analyzers 202 can include a sensor to determine decorticator 208 motor loads to allow the controller 100 to control moisture before decortication. In some embodiments, the one or more analyzers 202 can include a load sensor in product bins to allow the controller 100 to control component yields. In some embodiments, the one or more analyzers 202 can include a sensor to determine pressure and/or position of a hydraulic ram of the baler 210 to allow the controller 100 to monitor and adjust for fibre fineness. In some embodiments, the one or more analyzers 202 can include a sensor to determine bale weights of the baler 210 to allow the controller 100 to monitor and adjust for fibre fineness. In some embodiments, the one or more analyzers 202 can include a sensor to determine air backpressure and/or flow rate on a face of the bale to allow the controller 100 to monitor fibre fineness. The data science module 122 can link the data obtained by the one or more analyzers 202 to raw material attributes, which can help the CIM to better select materials based on those parameters, using, for example, KDD and auto-tuning model-predictive control (MPC). In further embodiments, other sensors at various stages of the decortication process can be included as the one or more analyzers 202.

Advantageously, the embodiments described herein can be used for automated production planning and scheduling. Using the predicted output, the system 200 can perform real-time statistical analysis based on open orders, committed delivery dates, availability of raw materials and other production inputs, market prices for inputs and products, historical and contracted customer needs and expectations. As an example, a customer can provide desired specifications for the resultant product, such as through an online portal, and receive predicted pricing and completion date. Advantageously, the system 200 can allow for "just in time" production planning and execution. Thus, reducing costs associated with carrying inventory, which ties up capital and production time, significantly impacting gross margins, virtually eliminating old or damaged goods, handling costs and the need to do clearance sales. Also advantageously, the system 200 allows for material traceability from reception through to finished products. Further, the system 200 allows for full quality data sets that include raw material, in-process and finished product testing along with full process operating data. In this way, the system 200 provides the ability to generate Certificates of Analysis (C of A) with every order.

By applying machine learning techniques to analyzer 202 data generated by the system 200, decortication processes can be increasingly automated, thereby reducing the requirement for human intervention, and ultimately improving efficiency and accuracy of the resultant product.

The above described embodiments of the invention are intended to be examples of the present disclosure and alterations and modifications may be effected thereto, by those of skill in the art, without departing from the scope of the present disclosure, which is defined solely by the claims appended hereto. For example, embodiments discussed can be varied and combined, in full or in part.

The invention claimed is:

1. A method for decortication processing on one or more input units of agricultural biomass comprising dicotyledonous plants, the method comprising:
    analyzing one or more characteristics of the input units with a spectral sensor to produce spectral analysis data;
    using a trained machine learning model to take the spectral analysis data as input and to estimate chemical composition of the agricultural biomass after decortication as output, the estimated chemical composition comprising at least one of cellulose, hemicellulose, lignin, extractives and ash, the machine learning model trained using sampling data comprising spectral analysis data analyzed from sample-units and corresponding measured chemical composition analysis of the sample-units;
    cutting the input units into a predetermined size, the predetermined size based on the estimated chemical composition;
    opening the cut input units;
    decorticating the opened input units to separate the opened input units into components, the components comprising bast, short fibre, hurd, and dust;
    cutting the bast into to one or more lengths;
    blending the hurd, cut bast and short fibre;
    pulverizing the blend; and
    combining the blend with thermoplastic polymers into a resultant product, the resultant product is a bio-composite product that comprises the blend combined with the thermoplastic polymers.

2. The method of claim 1, further comprising selecting material to be used in future input units.

3. The method of claim 1, further comprising identifying bast having short bast fibres and re-blending the identified bast back into the hurd to obtain the blend of the hurd, the cut bast and the short fibre.

4. The method of claim 1, further comprising determining a mechanical property of the resultant product by performing mechanical testing of the resultant product with a dynamic flexural analyzer.

5. The method of claim 1, wherein the estimation by the trained machine learning model comprises using knowledge discovery in databases (KDD) based on the one or more characteristics of the sample.

6. The method of claim 1, further comprising measuring bast fibre purity as part of the one or more characteristics of the sample with the spectral sensor at a stroke of a bale press hydraulic unit.

7. The method of claim 1, wherein the the blend of the hurd, cut bast and short fibre has over 50% short fibre content.

8. A controller executed on a computing device for decortication processing on one or more input units of agricultural biomass comprising dicotyledonous plants, the controller comprising at least one processing unit and a data storage, the at least one processing unit in communication with the data storage and configured to execute:
    a data science module to:
        using a trained machine learning model to take spectral analysis data as input and to estimate chemical composition of the agricultural biomass after decortication as output, the chemical composition comprising at least one of cellulose, hemicellulose, lignin, extractives and ash, the machine learning model trained using training data comprising sampling data comprising spectral analysis data analyzed from sample-units and corresponding measured chemical composition of the sample-units; and a control module to:
  receive one or more characteristics of the one or more input units from sensors, the sensors comprising a spectral sensor to produce the spectral analysis data;
  instruct a cutting unit to cut the one or more input units into a predetermined size, the predetermined size based on the estimated chemical composition;
  instruct an opening unit to open the one or more cut input units;
  instruct a decorticator to decorticate the one or more opened input units to separate the one or more opened input units into components, the components comprising bast, short fibre, hurd, and dust;
  instruct a blending unit to blend hurd, short fibre and cut bast;
  instruct a pulverizer to pulverize the hurd and the bast;
  instruct a compounder to combine the pulverized hurd and bast with thermoplastic polymers into a resultant product, the resultant product is a bio-composite product that comprises the blend combined with the thermoplastic polymers.

9. The controller of claim 8, wherein the control module further selects material to be used in future input units.

10. The controller of claim 8, wherein the control module further receives identifying information of bast having short bast fibres and instructs re-blending the identified bast back into the hurd to obtain the blend of the hurd, cut bast and short fibre.

11. The controller of claim 8, the control module further receives a mechanical property of the resultant product from mechanical testing of the resultant product by a dynamic flexural analyzer.

12. The controller of claim 8, wherein the estimation by the trained machine learning model comprises using knowledge discovery in databases (KDD) based on the one or more characteristics of the sample.

13. The controller of claim 8, further comprising the control module receiving a measured bast fibre purity as part of the one or more characteristics of the sample with the spectral sensor at a stroke of a bale press hydraulic unit.

\* \* \* \* \*